United States Patent
Minami et al.

(10) Patent No.: US 10,563,279 B2
(45) Date of Patent: Feb. 18, 2020

(54) HIGH STRENGTH STEEL SHEET HAVING HIGH YOUNG'S MODULUS AND METHOD FOR MANUFACTURING THE SAME

(71) Applicant: JFE STEEL CORPORATION, Tokyo (JP)

(72) Inventors: Hidekazu Minami, Tokyo (JP); Takeshi Yokota, Tokyo (JP); Kazuhiro Seto, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 783 days.

(21) Appl. No.: 14/909,253

(22) PCT Filed: Jul. 16, 2014

(86) PCT No.: PCT/JP2014/003775
§ 371 (c)(1),
(2) Date: Feb. 1, 2016

(87) PCT Pub. No.: WO2015/015739
PCT Pub. Date: Feb. 5, 2015

(65) Prior Publication Data
US 2016/0186283 A1 Jun. 30, 2016

(30) Foreign Application Priority Data

Aug. 2, 2013 (JP) ................................. 2013-160878
Aug. 2, 2013 (JP) ................................. 2013-160880

(51) Int. Cl.
| | |
|---|---|
| *C22C 38/12* | (2006.01) |
| *C21D 9/46* | (2006.01) |
| *C23C 2/02* | (2006.01) |
| *C23C 2/06* | (2006.01) |
| *C23C 2/28* | (2006.01) |
| *C22C 38/14* | (2006.01) |
| *C22C 38/00* | (2006.01) |
| *C22C 38/02* | (2006.01) |
| *C22C 38/04* | (2006.01) |
| *C22C 38/08* | (2006.01) |
| *C22C 38/16* | (2006.01) |
| *C22C 38/38* | (2006.01) |
| *C22C 38/60* | (2006.01) |
| *C21D 8/02* | (2006.01) |
| *C21D 6/00* | (2006.01) |
| *C22C 38/22* | (2006.01) |
| *C22C 38/26* | (2006.01) |
| *C22C 38/28* | (2006.01) |
| *C23C 2/40* | (2006.01) |

(52) U.S. Cl.
CPC ............ *C21D 9/46* (2013.01); *C21D 6/004* (2013.01); *C21D 6/005* (2013.01); *C21D 6/008* (2013.01); *C21D 8/0205* (2013.01); *C21D 8/0221* (2013.01); *C21D 8/0226* (2013.01); *C21D 8/0236* (2013.01); *C21D 8/0263* (2013.01); *C21D 8/0273* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/08* (2013.01); *C22C 38/12* (2013.01); *C22C 38/14* (2013.01); *C22C 38/16* (2013.01); *C22C 38/22* (2013.01); *C22C 38/26* (2013.01); *C22C 38/28* (2013.01); *C22C 38/38* (2013.01); *C22C 38/60* (2013.01); *C23C 2/02* (2013.01); *C23C 2/06* (2013.01); *C23C 2/28* (2013.01); *C23C 2/40* (2013.01)

(58) Field of Classification Search
CPC .................... C21D 2211/005; C21D 2211/008
See application file for complete search history.

(56) References Cited

U.S. PATENT DOCUMENTS

| | | | | |
|---|---|---|---|---|
| 2007/0144633 A1* | 6/2007 | Kizu | ........................ | C21D 9/46 148/603 |
| 2010/0314009 A1* | 12/2010 | Kaneko | .................... | C21D 9/48 148/533 |
| 2013/0000796 A1 | 1/2013 | Takeda et al. | | |

FOREIGN PATENT DOCUMENTS

| | | |
|---|---|---|
| CN | 1833042 A | 9/2006 |
| CN | 102348821 A | 2/2012 |
| CN | 103140594 A | 6/2013 |
| EP | 2 233 597 A1 | 9/2010 |
| EP | 2 407 568 A1 | 1/2012 |
| EP | 2623622 A1 | 8/2013 |

(Continued)

OTHER PUBLICATIONS

Mar. 23, 2016 Extended European Search Report issued in European Patent Application No. 14832333.0.

(Continued)

Primary Examiner — Vanessa T. Luk
(74) Attorney, Agent, or Firm — Oliff PLC

(57) ABSTRACT

A high strength steel sheet having a high Young's modulus, the steel sheet having a chemical composition including, by mass %, C: 0.060% or more and 0.150% or less, Si: 0.50% or more and 2.20% or less, Mn: 1.00% or more and 3.00% or less, and one or both of Ti: 0.001% or more and 0.200% or less and Nb: 0.001% or more and 0.200% or less, in which the contents of C, N, S, Ti, and Nb satisfy the equation $500 \leq C^* \leq 1300$. The steel sheet has a microstructure including ferrite in an amount of 20% or more and martensite in an amount of 5% or more, in terms of area ratio, such that the average grain size of the ferrite is 20.0 μm or less and the inverse intensity ratio of γ-fiber for α-fiber is 1.00 or more in the ferrite and the martensite.

8 Claims, No Drawings

(56) References Cited

FOREIGN PATENT DOCUMENTS

| | | |
|---|---|---|
| EP | 2749665 A1 | 7/2014 |
| JP | 2000-144329 A | 5/2000 |
| JP | 2006-183130 A | 7/2006 |
| JP | 2007-092127 A | 4/2007 |
| JP | 2007-092130 A | 4/2007 |
| JP | 2008-106352 A | 5/2008 |
| JP | 2008-240125 A | 10/2008 |
| JP | 5088041 B2 | 12/2012 |
| JP | 2013-104113 A | 5/2013 |
| JP | 2013104113 A * | 5/2013 |
| KR | 2011-0027075 A | 3/2011 |
| KR | 2012-0099505 A | 9/2012 |
| WO | 2013/031151 A1 | 3/2013 |
| WO | 2013/047820 A1 | 4/2013 |

OTHER PUBLICATIONS

Jan. 12, 2017 Office Action issued in Korean Patent Application No. 2015-7036798.
Dec. 7, 2017 Office Action issued in European Patent Application No. 14 832 333.0.
Oct. 28, 2014 International Search Report issued in International Search Report PCT/JP2014/003775.
Oct. 19, 2016 Office Action issued in Chinese Patent Application No. 201480043387.7.

* cited by examiner

HIGH STRENGTH STEEL SHEET HAVING HIGH YOUNG'S MODULUS AND METHOD FOR MANUFACTURING THE SAME

TECHNICAL FIELD

The present disclosure is directed to a high strength steel sheet having a high Young's modulus, which may be used for the structural parts of automobile bodies, and to a method for manufacturing the steel sheet.

BACKGROUND

Nowadays, since, for example, automobile exhaust gas regulations are requested in response to increasing concern about global environment problems, weight reduction of automobile bodies is a very important issue to be solved. Decreasing the thickness (thickness reduction) of a steel sheet by increasing the strength of a steel sheet is an effective method for reducing the weight of automobile bodies. Nowadays, as a result of a significant increase in the strength of a steel sheet, there is an active trend toward using a thin steel sheet having a tensile strength TS of 780 MPa or more and a thickness of less than 2.0 mm. However, since there is a problem of a decrease in the rigidity of automobile bodies due to thickness reduction, it is necessary to increase the rigidity of the structural parts of automobiles. Since the rigidity of structural parts having the same cross-section shape varies depending on the thickness and Young's modulus of a steel sheet, increasing the Young's modulus of a steel sheet is effective for achieving both sufficient weight reduction and satisfactory rigidity for structural parts.

It is known that Young's modulus varies greatly depending on the texture of a steel sheet and that, in the case of iron, which has a body-centered cubic lattice, Young's modulus is high in the <111> orientation, in which atom density is high, and conversely low in the <100> orientation, in which atom density is low. It is known that the Young's modulus of ordinary iron having no grain orientation anisotropy is about 206 GPa. In addition, by increasing atom density in a specific direction as a result of providing grain orientation anisotropy to iron, it is possible to increase Young's modulus in this direction. However, with regard to the rigidity of automobile bodies, since loads are applied from various directions, a steel sheet is required to have a high Young's modulus in all directions instead of in a specific direction.

In order to meet such a requirement, for example, Patent Literature 1 proposes a method for manufacturing a high strength thin steel sheet excellent in terms of rigidity, the method including hot-rolling a slab having a chemical composition containing, by mass %, C: 0.02% to 0.15%, Si: 0.3% or less, Mn: 1.0% to 3.5%, P: 0.05% or less, S: 0.01% or less, Al: 1.0% or less, N: 0.01% or less, Ti: 0.1% to 1.0%, and the balance being Fe and inevitable impurities, cold-rolling the hot-rolled steel sheet with a rolling reduction of 20% to 85%, and then performing recrystallization annealing in order to obtain a steel sheet having a microstructure of a ferrite single phase, a TS of 590 MPa or more, a Young's modulus of 230 GPa or more in a direction at an angle of 90° to the rolling direction, and an average Young's modulus in directions at angles of 0°, 45°, and 90° to the rolling direction of 215 GPa or more.

Patent Literature 2 proposes a method for manufacturing a high-rigidity high strength steel sheet excellent in terms of workability, the method including hot-rolling a slab having a chemical composition containing, by mass %, C: 0.05% to 0.15%, Si: 1.5% or less, Mn: 1.5% to 3.0%, P: 0.05% or less, S: 0.01% or less, Al: 0.5% or less, N: 0.01% or less, Nb: 0.02% to 0.15%, Ti: 0.01% to 0.15%, and the balance being Fe and inevitable impurities, cold-rolling the hot-rolled steel sheet with a rolling reduction of 40% to 70%, and then performing recrystallization annealing in order to obtain a steel sheet having a mixed microstructure of ferrite and martensite, a TS of 590 MPa or more and a Young's modulus of 230 GPa or more in a direction at a right angle to the rolling direction.

Patent Literature 3 proposes a method for manufacturing a high-rigidity high strength steel sheet excellent in terms of workability, the method including hot-rolling a slab having a chemical composition containing, by mass %, C: 0.02% to 0.15%, Si: 1.5% or less, Mn: 1.0% to 3.5%, P: 0.05% or less, S: 0.01% or less, Al: 1.5% or less, N: 0.01% or less, Ti: 0.02% to 0.50%, and the balance being Fe and inevitable impurities, cold-rolling the hot-rolled steel sheet with a rolling reduction of 50% or more, and then performing recrystallization annealing in order to obtain a steel sheet having a mixed microstructure of ferrite and martensite, a TS of 590 MPa or more and a Young's modulus of 230 GPa or more in a direction at a right angle to the rolling direction.

PATENT LITERATURE

PTL 1: Japanese Unexamined Patent Application Publication No. 2007-92130

PTL 2: Japanese Unexamined Patent Application Publication No. 2008-240125

PTL 3: Japanese Unexamined Patent Application Publication No. 2006-183130

SUMMARY

Technical Problem

However, in the case of the technique according to Patent Literature 1, in order to achieve a tensile strength of 780 MPa or more, it is necessary that V content be 0.4 mass % and W content be 0.5 mass %, in reference to, for example, its working examples. In addition, in order to further increase strength, since it is imperative to add expensive chemical elements such as Cr and Mo, there is a problem of an increase in alloy costs. In the case of the technique according to Patent Literature 2 and Patent Literature 3, it is possible to effectively increase Young's modulus in only one direction of a steel sheet. However, it is not possible to use it in order to increase the rigidity of the structural parts of automobiles, for which a steel sheet having a high Young's modulus in all directions is required.

The present disclosure is directed to a high strength steel sheet having a high Young's modulus which has a tensile strength of 780 MPa or more, a Young's modulus of 205 GPa or more in the rolling direction and in a direction at an angle of 45° to the rolling direction, a Young's modulus of 220 GPa or more in a direction at a right angle to the rolling direction, and good deep drawability and to provide a method for manufacturing the steel sheet. Here, examples of the high strength steel sheet having a high Young's modulus according to the present disclosure include a so-called high strength cold-rolled steel sheet having a high Young's modulus, which is a cold-rolled steel sheet, a so-called high strength coated steel sheet having a high Young's modulus, which is a coated steel sheet having a coating film on the surface thereof, a so-called high strength galvanized steel sheet having a high Young's modulus, which is a galvanized steel sheet having a galvanizing film on the surface thereof, and a so-called high strength galvannealed steel sheet having a high Young's modulus, which is a galvannealed steel sheet having a galvannealing film on the surface thereof.

Solution to Problem

The present inventors diligently conducted investigations regarding increasing the Young's modulus and deep drawability of a high strength steel sheet having a tensile strength of 780 MPa or more, and as a result, obtained the following knowledge.

By hot-rolling a steel material to which one or both chemical elements of Ti and Nb are added and in which the chemical composition of the other alloy chemical elements are appropriately controlled, and by then coiling the hot-rolled steel sheet at a high coiling temperature in order to precipitate Ti and Nb in the form of carbides while a solid solute C is retained, it is possible to grow a texture of α-fiber and γ-fiber when cold rolling is subsequently performed. Moreover, when annealing is performed, by growing a texture of α-fiber and γ-fiber as a result of controlling precipitates and annealing temperature in order to increase Young's modulus in all directions, and by utilizing a solid solute C in order to form ferrite and martensite in a certain amount or more, it is possible to achieve desired strength and to manufacture a high strength steel sheet having a high Young's modulus provided with good deep drawability.

By hot-rolling a steel material to which Ti and V are added and in which the chemical composition of the other alloy chemical elements are appropriately controlled, and by then coiling the hot-rolled steel sheet at a high coiling temperature in order to precipitate Ti and V in the form of carbides while a solid solute C is retained, it is possible to grow a texture of α-fiber and γ-fiber when cold rolling is subsequently performed. Moreover, when annealing is performed, by growing a texture of α-fiber and γ-fiber as a result of controlling precipitates and annealing temperature in order to increase Young's modulus in all directions, and by utilizing a solid solute C in order to form ferrite and martensite in a certain ratio or more, it is found that it is possible to achieve desired strength and to manufacture a high strength steel sheet having a high Young's modulus provided with good deep drawability.

The disclosed embodiments have been made in accordance with the above-described findings.

[1] A high strength steel sheet having a high Young's modulus, the steel sheet having a chemical composition containing, by mass %, C: 0.060% or more and 0.150% or less, Si: 0.50% or more and 2.20% or less, Mn: 1.00% or more and 3.00% or less, P: 0.100% or less, S: 0.0100% or less, Al: 0.010% or more and 2.500% or less, N: 0.0100% or less, one or both of Ti: 0.001% or more and 0.200% or less, Nb: 0.001% or more and 0.200% or less, and the balance being Fe and inevitable impurities, in which the contents of C, N, S, Ti and Nb satisfy relational expression (1) below, and a microstructure including ferrite in an amount of 20% or more in terms of area ratio and martensite in an amount of 5% or more in terms of area ratio, in which the average grain size of the ferrite is 20.0 or less, and in which the inverse intensity ratio of γ-fiber for α-fiber is 1.00 or more in each of the ferrite and the martensite:

$$500 \leq C^* \leq 1300 \quad (1),$$

where $C^*=(C-(12.0/47.9)\times(Ti-(47.9/14.0)\times N-(47.9/32.1)\times S)-(12.0/92.9)\times Nb)\times 10000$, where atomic symbols in the relational expression respectively represent the contents (mass %) of the corresponding chemical elements, and where $C^*$ is represented in units of mass ppm.

[2] A high strength steel sheet having a high Young's modulus, the steel sheet having a chemical composition containing, by mass %, C: 0.060% or more and 0.150% or less, Si: 0.50% or more and 2.20% or less, Mn: 1.00% or more and 3.00% or less, P: 0.100% or less, S: 0.0100% or less, Al: 0.010% or more and 2.500% or less, N: 0.0100% or less, Ti: 0.001% or more and 0.200% or less, V: 0.001% or more and 0.200% or less, and the balance being Fe and inevitable impurities, in which the contents of C, N, S, Ti, and V satisfy relational expression (2) below, and a microstructure including ferrite in an amount of 20% or more in terms of area ratio and martensite in an amount of 5% or more in terms of area ratio, in which the average grain size of the ferrite is 20.0 μm or less, and in which the inverse intensity ratio of γ-fiber for α-fiber is 1.00 or more in each of the ferrite and the martensite:

$$500 \leq C^* \leq 1300 \quad (2),$$

where $C^*=(C-(12.0/47.9)\times(Ti-(47.9/14.0)\times N-(47.9/32.1)\times S)-(12.0/50.9)\times V)\times 10000$, where atomic symbols in the relational expression respectively represent the contents (mass %) of the corresponding chemical elements, and where $C^*$ is represented in units of mass ppm.

[3] The high strength steel sheet having a high Young's modulus according to the item [1] or [2], the steel sheet further having an average r value of 1.05 or more and a limiting drawing ratio (LDR) of 2.03 or more.

[4] The high strength steel sheet having a high Young's modulus according to any one of the items [1] to [3], the steel sheet having the chemical composition further containing, by mass %, at least one chemical element selected from among Cr: 0.05% or more and 1.00% or less, Mo: 0.05% or more and 1.00% or less, Ni: 0.05% or more and 1.00% or less, and Cu: 0.05% or more and 1.00% or less.

[5] The high strength steel sheet having a high Young's modulus according to any one of the items [1] to [4], the steel sheet having the chemical composition further containing, by mass %, B: 0.0003% or more and 0.0050% or less.

[6] The high strength steel sheet having a high Young's modulus according to any one of the items [1] to [5], the steel sheet having the chemical composition further containing, by mass %, at least one chemical element selected from among Ca: 0.0010% or more and 0.0050% or less, Mg: 0.0005% or more and 0.0100% or less, and REM: 0.0003% or more and 0.0050% or less.

[7] The high strength steel sheet having a high Young's modulus according to any one of the items [1] and [3] to [6], the steel sheet having the chemical composition further containing, by mass %, Ta: 0.0010% or more and 0.1000% or less, in which the contents of C, N, S, Ti, Nb, and Ta satisfy relational expression (3) below instead of relational expression (1) above:

$$500 \leq C^* \leq 1300 \quad (3),$$

where $C^*=(C-(12.0/47.9)\times(Ti-(47.9/14.0)\times N-(47.9/32.1)\times S)-(12.0/92.9)\times Nb-(12.0/180.9)\times Ta)\times 10000$, where atomic symbols in the relational expression respectively represent the contents (mass %) of the corresponding chemical elements, and where $C^*$ is represented in units of mass ppm.

[9] The high strength steel sheet having a high Young's modulus according to any one of the items [1] and [3] to [7], the steel sheet having the chemical composition further containing, by mass %, at least one chemical element selected from among Sn: 0.0020% or more and 0.2000% or less and Sb: 0.0020% or more and 0.2000% or less.

[9] The high strength steel sheet having a high Young's modulus according to any one of the items [1] to [8], the high strength steel sheet having a high Young's modulus being a cold-rolled steel sheet.

[10] The high strength steel sheet having a high Young's modulus according to any one of the items [1] to [8], the high strength steel sheet having a high Young's modulus being a coated steel sheet having a coating film on the surface thereof.

[11] The high strength steel sheet having a high Young's modulus according to the item [10], the coating film being a galvanizing film and the coated steel sheet being a galvanized steel sheet.

[12] The high strength steel sheet having a high Young's modulus according to the item [10], the coating film being a galvannealing film and the coated steel sheet being a galvannealed steel sheet.

[13] A method for manufacturing a high strength steel sheet having a high Young's modulus, the method including heating a steel slab having the chemical composition according to any one of the items [1] to [8] to a temperature range of 1150° C. or higher and 1300° C. or lower, then hot-rolling the heated steel slab in a finishing temperature range of 850° C. or higher and 1000° C. or lower, coiling the hot-rolled steel sheet in a coiling temperature range of 500° C. or higher and 800° C. or lower, then cold-rolling the coiled steel sheet with a cold rolling reduction of 40% or more in order to obtain a cold-rolled steel sheet, heating the cold-rolled steel sheet to a temperature range of 450° C. or higher and 800° C. or lower, holding the heated steel sheet in the heating temperature range for 300 seconds or more, subsequently heating the held steel sheet to a temperature of 750° C. or higher and 950° C. or lower, and then cooling the heated steel sheet at an average cooling rate of 3° C./sec or more in a temperature range of 300° C. or higher and 700° C. or lower in order to obtain a cold-rolled steel sheet.

[14] A method for manufacturing a high strength steel sheet having a high Young's modulus, the method including heating a steel slab having the chemical composition according to any one of the items [1] to [8] to a temperature range of 1150° C. or higher and 1300° C. or lower, then hot-rolling the heated steel slab in a finishing temperature range of 850° C. or higher and 1000° C. or lower, coiling the hot-rolled steel sheet in a coiling temperature range of 500° C. or higher and 800° C. or lower, then cold-rolling the coiled steel sheet with a cold rolling reduction of 40% or more in order to obtain a cold-rolled steel sheet, heating the cold-rolled steel sheet to a temperature range of 450° C. or higher and 800° C. or lower, holding the heated steel sheet in the heating temperature range for 300 seconds or more, subsequently heating the held steel sheet to a temperature of 750° C. or higher and 950° C. or lower, cooling the heated steel sheet at an average cooling rate of 3° C./sec or more in a temperature range of 550° C. or higher and 700° C. or lower, and then performing a galvanizing treatment in order to obtain a galvanized steel sheet.

[15] A method for manufacturing a high strength steel sheet having a high Young's modulus, the method including heating a steel slab having the chemical composition according to any one of the items [1] to [8] to a temperature range of 1150° C. or higher and 1300° C. or lower, then hot-rolling the heated steel slab in a finishing temperature range of 850° C. or higher and 1000° C. or lower, coiling the hot-rolled steel sheet in a coiling temperature range of 500° C. or higher and 800° C. or lower, then cold-rolling the coiled steel sheet with a cold rolling reduction of 40% or more in order to obtain a cold-rolled steel sheet, heating the cold-rolled steel sheet to a temperature range of 450° C. or higher and 800° C. or lower, holding the heated steel sheet in the heating temperature range for 300 seconds or more, subsequently heating the held steel sheet to a temperature of 750° C. or higher and 950° C. or lower, cooling the heated steel sheet at an average cooling rate of 3° C./sec or more in a temperature range of 550° C. or higher and 700° C. or lower, then performing a galvanizing treatment, and then performing a galvannealing treatment in a temperature range of 470° C. or higher and 600° C. or lower in order to obtain a galvannealed steel sheet.

Advantageous Effects

According to the disclosed embodiments, it is possible to obtain a high strength steel sheet having a high Young's modulus which has a tensile strength of 780 MPa or more, a Young's modulus of 205 GPa or more in the rolling direction and in a direction at an angle of 45° to the rolling direction, a Young's modulus of 220 GPa or more in a direction at a right angle to the rolling direction, an average r value of 1.05 or more, and a limiting drawing ratio (LDR) of 2.03 or more. By using the high strength steel sheet having a high Young's modulus according to the present disclosure for, for example, the structural parts of automobile bodies, it is possible to increase fuel efficiency due to the weight reduction of automobile bodies.

DETAILED DESCRIPTION

Hereafter, the high strength steel sheet having a high Young's modulus and the method for manufacturing the steel sheet, according to the present disclosure, will be described in detail by dividing the description into parts respectively regarding the chemical composition, the microstructure, and the manufacturing method.

First, the chemical composition will be described for a first embodiment of the present disclosure. Here, in the following description, "%" used when describing a chemical composition of steel represents "mass %", unless otherwise noted.

[C: 0.060% or More and 0.150% or Less]

C is a chemical element which contributes to an increase in Young's modulus by controlling grain growth as a result of combining with Ti and/or Nb to form precipitates (carbides) when annealing is performed and which is imperative for controlling the area ratio and hardness of martensite when utilizing microstructure strengthening through the use of martensite. In the case where the C content is less than 0.060%, since there is an increase in ferrite grain size, since it is difficult to achieve the area ratio of martensite needed, and since there is no increase in the hardness of martensite, it is not possible to achieve sufficient strength. On the other hand, in the case where the C content is more than 0.150%, since it is necessary to increase the contents of Ti and/or Nb in accordance with an increase in C content, there is an increase in alloy costs while the effect of carbides becomes saturated. Therefore, the C content is set to be 0.060% or more and 0.150% or less, or preferably 0.080% or more and 0.130% or less.

[Si: 0.50% or More and 2.20% or Less]

Si is one of the important chemical elements in the disclosed embodiments. Since Si, which is a ferrite-stabilizing chemical element, increases Young's modulus, an average r value, and an LDR by promoting ferrite transformation in a cooling process when annealing is performed, and since Si is capable of promoting the formation of low temperature transformation-forming phases by stabilizing austenite as a result of concentrating C in austenite, it is possible to increase the strength of steel as needed. Moreover, since Si which forms a solid solution in ferrite increases the work hardening capability, there is an increase in the ductility of ferrite. In order to realize such effects, it is necessary that the Si content be 0.50% or more. On the other hand, in the case where the Si content is more than 2.20%, there is a decrease in weldability of a steel sheet, and the occurrence of a so-called red scale, a surface defect in a hot-rolled steel sheet, is promoted because the formation of fayalite is promoted on the surface of a slab when heating is performed before hot rolling is performed. Moreover, Si oxides which are formed on the surface decrease the phosphatability in the case where a steel sheet is used as a cold rolled steel sheet, and in addition, Si oxides which are formed on the surface induce bare spots in the case where a steel sheet is used as a galvanized steel sheet. Therefore, the Si content is set to be 0.50% or more and 2.20% or less, or preferably 0.80% or more and 2.10% or less.

[Mn: 1.00% or More and 3.00% or Less]

Mn greatly contributes to an increase in strength by increasing hardenability and by promoting the formation of low temperature transformation-forming phases in a cooling process when annealing is performed, and in addition, contributes to an increase in strength by functioning as a solid solution strengthening chemical element. In order to realize such effects, it is necessary that the Mn content be 1.00% or more. On the other hand, in the case where the Mn content is more than 3.00%, since the formation of ferrite, which is necessary for increasing Young's modulus, an average r value, and an LDR in a cooling process when annealing is performed, is markedly inhibited, and since there is an increase in the strength of steel due to an increase in the amount of low temperature transformation-forming phases formed, there is a decrease in workability. Also, such a large amount of Mn decreases the weldability of a steel sheet. Therefore, the Mn content is set to be 1.00% or more and 3.00% or less, or preferably 1.50% or more and 2.80% or less.

[P: 0.100% or Less]

P is a chemical element which is effective for solid solution strengthening, which may be added in accordance with desired strength, and which is effective for forming a multi-phase microstructure in order to promote ferrite transformation. However, in the case where the P content is more than 0.100%, there is a decrease in spot weldability. In addition, there is a decrease in zinc coatability as a result of decreasing an alloying speed in the case where an alloying treatment is performed on a galvanizing film. Therefore, it is necessary that the P content be 0.100% or less, or preferably 0.001% or more and 0.100% or less.

[S: 0.0100% or Less]

Since S causes hot cracking when hot rolling is performed, and since S decreases local deformation capability as a result of being present in the form of sulfides, it is preferable that the S content be as small as possible. Therefore, it is preferable that the S content be 0.0100% or less, or more preferably limited to 0.0050% or less. On the other hand, in the case where the S content is limited to less than 0.0001%, there is an increase in manufacturing costs. Accordingly, it is preferable that the lower limit of the S content be set to be 0.0001%. Therefore, it is preferable that the S content be 0.0100% or less, or preferably 0.0001% or more and 0.0100% or less, or more preferably 0.0001% or more and 0.0050% or less.

[Al: 0.010% or More and 2.500% or Less]

Since Al is effective for steel as a deoxidization agent, it is preferable that the Al content be 0.010% or more. Moreover, since Al, which is a ferrite-forming chemical element, promotes the formation of ferrite in a cooling process when annealing is performed, and since Al promotes the formation of low temperature transformation-forming phases by stabilizing austenite as a result of concentrating C in austenite, it is possible to increase the strength of steel as needed. In order to realize such effects, it is more preferable that the Al content be 0.020% or more. On the other hand, in the case where the Al content is more than 2.500%, since a temperature range for forming an austenite single phase is eliminated due to a significant rise in the Ar3 transformation temperature, it is not possible to finish hot rolling in a temperature range for forming austenite. Therefore, the Al content is set to be 0.010% or more and 2.500% or less, or preferably 0.020% or more and 2.500% or less.

[N: 0.0100% or Less]

N is a chemical element which decreases the ageing resistance of steel. In particular, in the case where the N content is more than 0.0100%, there is a significant decrease in ageing resistance. Therefore, the N content is set to be 0.0100% or less, or more preferably limited to 0.0060% or less. In addition, it is acceptable that the lower limit of the N content be about 0.0005% under some constraints regarding manufacturing techniques.

In the present disclosure, in addition to the constituent chemical elements described above, it is necessary that one or both of Ti: 0.001% or more and 0.200% or less and Nb: 0.001% or more and 0.200% or less be added in order to form ferrite grown in an orientation which is advantageous for increasing Young's modulus.

[Ti: 0.001% or More and 0.200% or Less]

Ti effectively contributes to an increase in strength by forming ferrite grown in an orientation which is advantageous for increasing Young's modulus, an average r value, and an LDR and by inhibiting an increase in the size of recrystallized grains when annealing is performed as a result of forming precipitates with C, S, and N. In addition, in the case where B is added, since the precipitation of BN is inhibited as a result of Ti precipitating N in the form of TiN, the effect of B described below is effectively realized. In order to realize such effects, it is necessary that the Ti content be 0.001% or more. On the other hand, in the case where the Ti content is more than 0.200%, since carbonitrides having a large grain size are retained because carbonitrides are not completely dissolved when ordinary slab reheating is performed, the effects of increasing strength and inhibiting recrystallization are not realized. Also, in the case where hot rolling is performed without performing a process in which a continuously cast slab is first cooled and then reheated, the contribution of the additional amount of Ti over 0.200% to inhibiting recrystallization is small, and there is an increase in alloy costs. Therefore, the Ti content is set to be 0.001% or more and 0.200% or less, preferably 0.005% or more and 0.200% or less, or more preferably 0.010% or more and 0.200% or less.

[Nb: 0.001% or More and 0.200% or Less]

Nb effectively contributes to an increase in strength by forming ferrite grown in an orientation which is advantageous for increasing Young's modulus, an average r value, and an LDR and by inhibiting an increase in the size of recrystallized grains when annealing is performed as a result of forming fine precipitates when hot rolling or annealing is performed. In particular, by appropriately controlling the Nb content, since there is a decrease in the grain size of an austenite phase formed as a result of reverse transformation when annealing is performed, the size of the microstructure is also decreased after annealing has been performed and there is an increase in strength of the steel. In order to realize such effects, it is necessary that the Nb content be 0.001% or more. On the other hand, in the case where the Nb content is more than 0.200%, since carbonitrides having a large grain size are retained because carbonitrides are not completely dissolved when ordinary slab reheating is performed, the effects of increasing strength and inhibiting recrystallization are not realized. Also, in the case where hot rolling is performed without performing a process in which a continuously cast slab is first cooled and then reheated, the contribution of the additional amount of Nb over 0.200% to inhibiting recrystallization is small, and there is an increase in alloy costs. Therefore, the Nb content is set to be 0.001% or more and 0.200% or less, preferably 0.005% or more and 0.200% or less, or more preferably 0.010% or more and 0.200% or less.

In addition, in some embodiments, it is necessary that the contents of C, N, S, Ti, and Nb described above satisfy relational expression (1) below.

$$500 \leq C^* \leq 1300 \quad (1),$$

where $C^*=(C-(12.0/47.9)\times(Ti-(47.9/14.0)\times N-(47.9/32.1)\times S)-(12.0/92.9)\times Nb)\times 10000$, where atomic symbols in the relational expression respectively represent the contents (mass %) of the corresponding chemical elements, and where $C^*$ is represented in units of mass ppm.

By controlling the amount of a solid solute C to be 500 mass ppm or more and 1300 mass ppm or less, it is possible to grow an orientation which is advantageous for increasing Young's modulus, an average r value, and an LDR when cold rolling and annealing are performed, and to achieve satisfactory strength. Therefore, $C^*$, which represents the amount of a solid solute C, is set to be 500 mass ppm or more and 1300 mass ppm or less as expressed by relational expression (1) above. Here, C in steel combines with Ti and Nb to form precipitates such as TiC and NbC. On the other hand, Ti in steel combines with N and S, more readily than with C, to form precipitates such as TiN and TiS. Therefore, it is possible to derive the amount of a solid solute C in steel in the form of $C^*$ described above in consideration of such precipitation.

Some embodiments include the addition of at least one chemical element selected from among Cr: 0.05% or more and 1.00% or less, Mo: 0.05% or more and 1.00% or less, Ni: 0.05% or more and 1.00% or less, and Cu: 0.05% or more and 1.00% or less, B: 0.0003% or more and 0.0050% or less, at least one chemical element selected from among Ca: 0.0010% or more and 0.0050% or less, Mg: 0.0005% or more and 0.0100% or less, and REM: 0.0003% or more and 0.0050% or less, Ta: 0.0010% or more and 0.1000% or less, and at least one chemical element selected from among Sn: 0.0020% or more and 0.2000% or less and Sb: 0.0020% or more and 0.2000% or less to the high strength steel sheet having a high Young's modulus according to the present disclosure separately or in combination in addition to the constituent chemical elements described above.

Cr, Mo, Ni, and Cu not only function as solid solution strengthening chemical elements but also facilitate the formation of a multi-phase microstructure by stabilizing austenite in a cooling process when annealing is performed. In order to realize such an effect, it is necessary that the content of each of Cr, Mo, Ni, and Cu be 0.05% or more. On the other hand, in the case where the content of each of Cr, Mo, Ni, and Cu is more than 1.00%, there is a decrease in formability and spot weldability. Therefore, in the case where Cr, Mo, Ni, and Cu are added, the content of each of Cr, Mo, Ni, and Cu is set to be 0.05% or more and 1.00% or less.

Since B promotes the formation of martensite by stabilizing austenite as a result of inhibiting the formation of pearlite or bainite from austenite, B is effective for achieving satisfactory strength. Such an effect is realized in the case where the B content is 0.0003% or more. On the other hand, in the case where the B content is more than 0.0050%, the effect becomes saturated, and there is a decrease in manufacturability when hot rolling is performed. Therefore, in the case where B is added, the B content is set to be 0.0003% or more and 0.0050% or less.

Ca, Mg, and REM are chemical elements which are used for deoxidization and which are effective for decreasing the negative effect of sulfides on local ductility by spheroidizing the shape of sulfides. In order to realize such effects, it is necessary that the contents of Ca, Mg, and REM be respectively 0.0010% or more, 0.0005% or more, and 0.0003% or more. However, in the case where the contents of Ca, Mg, and REM are respectively more than 0.0050%, more than 0.0100%, and more than 0.0050%, since there is an increase in the amount of inclusions and the like, surface defects and internal defects occur. Therefore, in the case where Ca, Mg, and REM are added, the contents of Ca, Mg, and REM are respectively set to be 0.0010% or more and 0.0050% or less, 0.0005% or more and 0.0100% or less, and 0.0003% or more and 0.0050% or less.

Ta, like Ti and Nb, contributes to an increase in strength by forming alloy carbides and alloy carbonitrides. In addition, it is considered that, since Ta significantly inhibits an increase in the grain size of precipitates by being partially dissolved in Nb carbides and Nb carbonitrides so as to form compound precipitates such as (Nb, Ta)–(C, N), Ta is effective for stabilizing the contribution to an increase in strength through precipitation strengthening. Therefore, it is preferable that Ta be added. Here, it is possible to realize the effect of stabilizing precipitates described above by controlling the Ta content to be 0.0010% or more. On the other hand, in the case where the Ta content is excessively large, the effect of stabilizing the precipitates becomes saturated, and there is an increase in alloy costs. Therefore, in the case where Ta is added, the Ta content is set to be 0.0010% or more and 0.1000% or less.

In addition, in the case where Ta is added, it is necessary that the contents of C, N, S, Ti, Nb and Ta described above satisfy relational expression (3) below instead of relational expression (1) above.

$$500 \leq C^* \leq 1300 \quad (3),$$

where $C^*=(C-(12.0/47.9)\times(Ti-(47.9/14.0)\times N-(47.9/32.1)\times S)-(12.0/92.9)\times Nb-(12.0/180.9)\times Ta)\times 10000$, where atomic symbols in the relational expression respectively represent the contents (mass %) of the corresponding chemical elements, and where $C^*$ is represented in units of mass ppm.

By controlling the amount of a solid solute C to be 500 mass ppm or more and 1300 mass ppm or less, it is possible to grow an orientation which is advantageous for increasing Young's modulus, an average r value, and an LDR when cold rolling and annealing are performed, and to achieve satisfactory strength. Therefore, $C^*$, which represents the amount of a solid solute C, is set to be 500 mass ppm or more and 1300 mass ppm or less as expressed by relational expression (3) above. Here, C in steel combines with Ti, Nb, and Ta to form precipitates. On the other hand, Ti in steel combines with N and S, more readily than with C, to form precipitates such as TiN and TIS. Therefore, it is possible to derive the amount of a solid solute C in steel in the form of C* described above in consideration of such precipitation.

Sn and Sb are added as needed from the viewpoint of inhibiting decarburization caused by nitration and oxidation of the surface of a steel sheet in a region within about several tens of μm in the surface layer of a steel sheet. While such nitration and oxidation are inhibited, Sn and Sb are capable of increasing fatigue resistance and ageing resistance by preventing a decrease in the amount of martensite formed in the surface layer of a steel sheet. In order to realize such effects, it is necessary that the content of each of Sn and Sb be 0.0020% or more. On the other hand, in the case where the content of each of these chemical elements is more than 0.2000%, there is a decrease in toughness. Therefore, in the case where Sn and Sb are added, the content of each of Sn and Sb is set to be 0.0020% or more and 0.2000% or less.

The remaining constituent chemical elements other than those whose contents are described above are Fe and inevitable impurities. Here, chemical elements other than those described above may be added as long as the effect of the present disclosure is not decreased. However, since oxygen (O) has a negative effect on the quality of a steel sheet because O forms non-metal inclusions, it is preferable that the O content be limited to 0.003% or less.

Hereafter, the microstructure will be described.

[Area Ratio of Ferrite: 20% or More]

Ferrite is effective for growing a texture which is advantageous for increasing Young's modulus, an average r value, and an LDR. In order to realize such an effect, it is necessary that the area ratio of ferrite be 20% or more. It is more preferable that the area ratio of ferrite be 30% or more in order to further increase Young's modulus, an average r value, and an LDR. Herein, the meaning of "ferrite" includes bainitic ferrite, polygonal ferrite, and acicular ferrite, which do not contain carbide precipitates, in addition to so-called ferrite.

[Area Ratio of Martensite: 5% or More]

As a result of martensite being included, there is an increase in strength and strength-elongation balance. In the case where the area ratio of martensite is less than 5%, it is difficult to achieve the tensile strength TS needed, specifically, a tensile strength TS of 780 MPa or more. Therefore, it is necessary that the area ratio of martensite be set to be 5% or more.

Here, it is possible to determine the area ratios of ferrite and martensite by polishing a cross section (L-cross section) in the thickness direction parallel to the rolling direction of a steel sheet, by etching the polished cross section by using a 3 vol. %-nital solution, by observing a portion located at ¼ of the thickness (position located at a distance equal to ¼ of the thickness in the depth direction from the surface of a steel sheet) by using a SEM (Scanning Electron Microscope) at a magnification of 2000 times in three fields of view, by calculating the area ratios of the three fields of view for each of the microstructures (ferrite and martensite) by analyzing the microstructure images obtained from the three fields of view by using Adobe Photoshop produced by Adobe Systems Inc., and by calculating the average value of the three area ratios. In addition, in the microstructure image described above, ferrite is identified as a gray microstructure (matrix microstructure), and martensite is identified as a white microstructure.

[Average Grain Size of Ferrite: 20.0 μm or Less]

In the case where the average grain size of ferrite is more than 20.0 μm, it is not possible to achieve high strength. Therefore, the average grain size of ferrite is set to be 20.0 μm or less in order to increase strength by decreasing the grain size of ferrite. In addition, although it is not necessary to put a particular limitation on the average grain size of ferrite, since there is a tendency for ductility to decrease in the case where the average grain size of ferrite is less than 1 μm, it is preferable that the average grain size of ferrite be 1 μm or more.

Here, the average grain size of ferrite was, by using Adobe Photoshop described above, calculated by dividing the value obtained by calibrating the length of a line segment drawn on an image to a practical length by the number of grains through which the line segment drawn on an image passes.

Here, in the microstructure according to the disclosed embodiments, it is preferable that the sum of the area ratios of ferrite and martensite described above be 90% or more. There is no decrease in the effect of the present disclosure in the case where the microstructure includes, for example, tempered martensite, bainite, tempered bainite, pearlite, and carbides such as cementite in an amount of 10% or less in terms of area ratio in addition to ferrite and martensite.

[Inverse Intensity Ratios of γ-Fiber for α-Fiber in Ferrite and Martensite: 1.00 or More Each]

α-fiber is a fiber texture having the <110> axis parallel to the rolling direction, and γ-fiber is a fiber texture having the <111> axis parallel to the normal direction to the rolling direction. Metal having a body-centered cubic structure is characterized in that the α-fiber and the γ-fiber are strongly grown due to rolling deformation and in that such kinds of textures are also formed due to recrystallization.

Since it is possible to increase Young's modulus, an average r value, and an LDR in all directions by growing γ-fiber in ferrite and martensite, it is necessary that the inverse intensity ratios of γ-fiber for α-fiber in ferrite and martensite at a position located at ¼ of the thickness of a steel sheet be 1.00 or more. Here, the inverse intensity ratios of γ-fiber for α-fiber in ferrite and martensite were calculated by polishing a cross section (L-cross section) in the thickness direction parallel to the rolling direction of a steel sheet, by determining grain orientations in a portion located at ¼ of the thickness (position located at a distance equal to ¼ of the thickness in the depth direction from the surface of a steel sheet) by using SEM-EBSD (Electron Back-Scatter Diffraction), by distributing the obtained data to the microstructures (ferrite and martensite) by using OIM Data Analysis produced by AMETEK Inc., and by calculating inverse intensity ratios of γ-fiber for α-fiber.

By controlling the microstructure of steel having the chemical composition described above to be one described above, a high strength steel sheet having a high Young's modulus is obtained. In addition, the high strength steel sheet having a high Young's modulus according to the present disclosure may be a cold-rolled steel sheet, a coated steel sheet having a coating film such as a galvanizing film, a galvannealing film, an electrogalvanizing film, or an Al coating film on the surface thereof, or a hot-rolled steel sheet.

The high strength steel sheet having a high Young's modulus according to the disclosed embodiments described above has the following characteristics.

[Young's Modulus in the Rolling Direction and in a Direction at an Angle of 45° to the Rolling Direction is 205 GPa or More, and Young's Modulus in a Direction at a Right Angle to the Rolling Direction is 220 GPa or More]

In the case where a thickness is reduced by using a high strength steel sheet having a TS of 780 MPa or more, there is a decrease in the rigidity of structural parts. Therefore, in order to achieve both sufficient weight reduction and satisfactory rigidity of structural parts, in the present disclosure, Young's modulus is limited to be 205 GPa or more in the rolling direction and in a direction at an angle of 45° to the rolling direction and 220 GPa or more in a direction at a right angle to the rolling direction, preferably 208 GPa or more in the rolling direction and in a direction at an angle of 45° to the rolling direction and 223 GPa or more in a direction at a right angle to the rolling direction, or more preferably 210 GPa or more in the rolling direction and in a direction at an angle of 45° to the rolling direction and 225 GPa or more in a direction at a right angle to the rolling direction.

[Average r Value: 1.05 or More]

A high strength steel sheet having a TS of 780 MPa or more is much poorer in terms of press formability, in particular deep drawability, than a mild steel sheet. Therefore, in order to use a high strength steel sheet for members such as inner and outer panels and chassis which are formed mainly by using a drawing method, in the examples of the present disclosure, an average r value is limited to be 1.05 or more, preferably 1.07 or more, or more preferably 1.10 or more.

[Limiting Drawing Ratio (LDR): 2.03 or More]

A high strength steel sheet having a TS of 780 MPa or more is much poorer in terms of press formability, in particular deep drawability, than a mild steel sheet. Therefore, in order to use a high strength steel sheet for members such as inner and outer panels and chassis which are formed mainly by using a drawing method, in the examples of the present disclosure, a limiting drawing ratio (LDR) is limited to be 2.03 or more, preferably 2.06 or more, more preferably 2.09 or more, or even more preferably 2.12 or more.

Hereafter, the method for manufacturing such a high strength steel sheet having a high Young's modulus will be described.

First, in the case of producing a cold-rolled steel sheet, the method includes heating a steel slab having the chemical composition described above obtained by using, for example, a continuous casting method to a temperature range of 1150° C. or higher and 1300° C. or lower (steel slab heating process), then hot-rolling the heated steel slab in a finishing temperature range of 850° C. or higher and 1000° C. or lower (hot rolling process), coiling the hot-rolled steel sheet in a coiling temperature range of 500° C. or higher and 800° C. or lower (coiling process), then cold-rolling the coiled steel sheet with a cold rolling reduction of 40% or more in order to obtain a cold-rolled steel sheet (cold rolling process), heating the cold-rolled steel sheet to a temperature range of 450° C. or higher and 800° C. or lower (heating process), holding the heated steel sheet in the heating temperature range for 300 seconds or more (holding process after the heating process), subsequently heating the held steel sheet to a temperature of 750° C. or higher and 950° C. or lower (reheating process), and then cooling the heated steel sheet at an average cooling rate of 3° C./sec or more in a temperature range of 300° C. or higher and 700° C. or lower (cooling process after the reheating process). By using this manufacturing method, it is possible to obtain a high strength steel sheet having a high Young's modulus, which is a cold-rolled steel sheet, that is, a high strength cold-rolled steel sheet having a high Young's modulus.

In addition, in the case of producing a galvanized steel sheet, the method includes heating a steel slab having the chemical composition described above to a temperature range of 1150° C. or higher and 1300° C. or lower (steel slab heating process), then hot-rolling the heated steel slab in a finishing temperature range of 850° C. or higher and 1000° C. or lower (hot rolling process), coiling the hot-rolled steel sheet in a coiling temperature range of 500° C. or higher and 800° C. or lower (coiling process), then cold-rolling the coiled steel sheet with a cold rolling reduction of 40% or more in order to obtain a cold-rolled steel sheet (cold rolling process), heating the cold-rolled steel sheet to a temperature range of 450° C. or higher and 800° C. or lower (heating process), holding the heated steel sheet in the heating temperature range for 300 seconds or more (holding process after the heating process), subsequently heating the held steel sheet to a temperature of 750° C. or higher and 950° C. or lower (reheating process), then cooling the heated steel sheet at an average cooling rate of 3° C./sec or more in a temperature range of 550° C. or higher and 700° C. or lower (cooling process after the reheating process), and then performing a galvanizing treatment (galvanizing process). By using this manufacturing method, it is possible to obtain a high strength steel sheet having a high Young's modulus, which is a galvanized steel sheet, that is, a high strength galvanized steel sheet having a high Young's modulus. Moreover, in the case of producing a galvannealed steel sheet, the method further includes, after the galvanizing treatment has been performed, performing a galvannealing treatment in a temperature range of 470° C. or higher and 600° C. or lower (alloying treatment process). By using this manufacturing method, it is possible to obtain a high strength steel sheet having a high Young's modulus, which is a galvannealed steel sheet, that is, a high strength galvannealed steel sheet having a high Young's modulus.

Hereafter, each process will be described in detail.

[Steel Slab Heating Process]

Ti- and Nb-based precipitates which are present and untreated at the stage of heating a cast steel slab will be retained in the form of precipitates having a large grain size in a finally obtained steel sheet without contributing to an increase in strength, Young's modulus, an average r value, or an LDR. Therefore, when a steel slab is heated, it is necessary to re-dissolve Ti- and Nb-based precipitates which are precipitated when the steel slab is cast. The contribution of this method to an increase in strength is recognized when heating is performed at a temperature of 1150° C. or higher. In addition, it is preferable that heating be performed at a temperature of 1150° C. or higher in order to achieve a smooth steel sheet surface without a crack or irregularity by removing defects such as blowholes and segregates in the surface layer of a slab along with scale. However, in the case where the heating temperature is higher than 1300° C., there is an increase in the grain size of austenite, which results in a decrease in strength and ductility due to an increase in the grain size of the final microstructure. Therefore, a steel slab is heated to a temperature range of 1150° C. or higher and 1300° C. or lower. That is, the slab heating temperature is set to be 1150° C. or higher and 1300° C. or lower.

[Hot Rolling Process]

A hot rolling process consists of rough rolling and finish rolling, and a heated steel slab is made into a hot-rolled steel sheet by preforming such rough rolling and finish rolling. In the case where the finishing temperature of hot rolling is higher than 1000° C., since there is a significant increase in the amount of oxides (hot rolling scale) formed, the interface between base steel and oxides is roughened, which results in a decrease in surface quality after downstream processes such as a pickling process and a cold rolling process have been performed. On the other hand, in the case where the finishing temperature of hot rolling is lower than 850° C., there is an increase in rolling load due to an increase in rolling force, and an abnormal texture is grown due to an increase in rolling reduction without recrystallization of austenite. As a result, since there is significant in-plane anisotropy in the final product, there is a decrease not only in the uniformity of material properties but also in Young's modulus, an average r value, and an LDR. Therefore, the finishing temperature of hot rolling is set to be 850° C. or higher and 1000° C. or lower, or preferably 850° C. or higher and 950° C. or lower.

Here, a steel slab is made into a sheet bar by performing rough rolling under ordinary conditions. In the case where the heating temperature is low, it is preferable that a sheet bar be heated by using a bar heater and the like before finish rolling is performed from the viewpoint of preventing problems when hot rolling is performed.

[Coiling Process]

In the case where a coiling temperature is higher than 800° C. when a hot-rolled steel sheet is coiled after hot rolling has been performed, the integration of an orientation during cold rolling is obstructed due to an increase in the grain size of ferrite, and there is a decrease in the effect of inhibiting the recrystallization of ferrite and an increase in the grain size of austenite when annealing is performed due to an increase in the grain size of carbonitrides of Ti and Nb. On the other hand, in the case where the coiling temperature is lower than 500° C., hard bainite and martensite are formed in addition to ferrite. In this case, non-uniform deformation occurs when cold rolling is performed. As a result, since a texture is not grown after annealing has been performed, there is no increase in Young's modulus, an average r value, or an LDR. Therefore, the coiling temperature is set to be 500° C. or higher and 800° C. or lower. That is, coiling is performed in a temperature range of 500° C. or higher and 800° C. or lower after hot rolling has been performed.

[Cold Rolling Process]

By performing cold rolling after the hot rolling process, α-fiber and γ-fiber, which are advantageous for increasing Young's modulus, an average r value, and an LDR, are integrated. That is, by growing α-fiber and γ-fiber by performing cold rolling, since it is possible to increase the amount of ferrite having α-fiber and γ-fiber, in particular, γ-fiber in a microstructure after an annealing process has been performed, it is possible to increase Young's modulus, an average r value, and an LDR. In order to realize such an effect, it is necessary that the cold rolling reduction be 40% or more. It is more preferable that the cold rolling reduction be 50% or more from the viewpoint of further increasing Young's modulus, an average r value, and an LDR. On the other hand, since there is difficulty in manufacturing due to an increase in rolling force in the case where the cold rolling reduction is high, it is preferable that the cold rolling reduction be 80% or less. Therefore, the cold rolling reduction is set to be 40% or more, preferably 40% or more and 80% or less, or more preferably 50% or more and 80% or less. Here, without putting any particular limitation on the number of rolling passes or the rolling reduction per pass of cold rolling, the effect of the present disclosure is realized.

[Heating Process]

In the case where an annealing temperature in a heating process is low, since a non-recrystallized microstructure is retained, the integration into γ-fiber is difficult, which results in a decrease in Young's modulus, an average r value, and an LDR in all directions. Therefore, the annealing temperature is set to be 450° C. or higher. It is preferable that the annealing temperature be 550° C. or higher from the viewpoint of further increasing Young's modulus, an average r value, and an LDR. On the other hand, in the case where the annealing temperature is higher than 800° C., there is an increase in the grain size of austenite, it is difficult for ferrite retransformed in a cooling process after annealing has been performed to be integrated into α-fiber and γ-fiber, in particular, into γ-fiber. Therefore, the annealing temperature in the heating process is set to be 450° C. or higher and 800° C. or lower. That is, heating is performed in a temperature range of 450° C. or higher and 800° C. or lower, or preferably in a temperature range of 550° C. or higher and 800° C. or lower, in the heating process.

[Holding Process after a Heating Process]

In the case where a holding time in the above-described temperature range of 450° C. or higher and 800° C. or lower is less than 300 seconds, since a non-recrystallized microstructure is retained, the integration into γ-fiber is difficult, which results in a decrease in Young's modulus, an average r value, and an LDR in all directions. Therefore, the holding time is set to be 300 seconds or more. In addition, although it is not necessary to put a particular limitation on the upper limit of the holding time, since there is an increase in the grain size of recrystallized ferrite in the case where the holding time is more than 100000 seconds, it is preferable that the holding time be 100000 seconds or less. Therefore, the holding time is set to be 300 seconds or more, or preferably 300 seconds or more and 100000 seconds or less. In the case where a cooling process is performed after the heating process, cooling may be performed to room temperature, or a treatment passing through an over-ageing temperature range may be performed. Here, although it is not necessary to put a particular limitation on a cooling rate, since there may be a deterioration in the shape of a steel sheet in the case where an average cooling rate down to room temperature or an over-ageing temperature range is more than 80° C./sec, it is preferable that the average cooling rate be 80° C./sec or less.

[Reheating Process]

In the case where an annealing temperature in a reheating process is lower than 750° C., an insufficient amount of austenite is formed. As a result, since it is not possible to form a sufficient amount of martensite in a cooling process after annealing has been performed in the reheating process, it is difficult to achieve the desired strength. In addition, since a non-recrystallized microstructure is retained, there is a decrease in ductility. Therefore, the annealing temperature is set to be 750° C. or higher. In addition, in the case where the annealing temperature when annealing is performed is higher than 950° C., since there is an increase in the grain size of austenite, there is a tendency for the tensile strength TS of a steel sheet finally obtained to decrease. Therefore, the annealing temperature is set to be 950° C. or lower. Therefore, the annealing temperature in the reheating process is set to be 750° C. or higher and 950° C. or lower. That is, heating is performed to a temperature range of 750° C. or higher and 950° C. or lower in the reheating process.

[Cooling Process after a Reheating Process]

In the case where a cooling rate is excessively small in a cooling process after annealing has been performed in the reheating process described above, since it is not possible to achieve the desired area ratio of martensite because untransformed austenite is transformed into pearlite, it is difficult to achieve the desired strength. For example, in the case where an average cooling rate is less than 3° C./sec in a temperature range of 300° C. or higher and 700° C. or lower in the case of producing a cold-rolled steel sheet, or in the case where an average cooling rate is less than 3° C./sec in a temperature range of 550° C. or higher and 700° C. or lower in the case of producing a galvanized steel sheet, since it is not possible to achieve the desired area ratio of martensite because untransformed austenite is transformed into pearlite, it is difficult to achieve the desired strength. Therefore, in the case of producing a cold-rolled steel sheet, the average cooling rate is set to be 3° C./sec or more in a temperature range of 300° C. or higher and 700° C. or lower. In addition, in the case of producing a galvanized steel sheet, the average cooling rate is set to be 3° C./sec or more in a temperature range of 550° C. or higher and 700° C. or lower. In addition, although it is not necessary to put a particular limitation on the upper limit of the cooling rate, since there may be a deterioration in the shape of a steel sheet in the case where the average cooling rate described above is more than 80° C./sec, it is preferable that the average cooling rate described above be 80° C./sec or less. Therefore, the average cooling rate is set to be 3° C./sec or more, or preferably 3° C./sec or more and 80° C./sec or less, in a temperature range of 300° C. or higher and 700° C. or lower in the case of producing a cold-rolled steel sheet, or in a temperature range of 550° C. or higher and 700° C. or lower in the case of producing a galvanized steel sheet.

After the cooling process following the reheating process has been performed, a treatment passing through an over-ageing temperature range may be performed in the case of producing a cold-rolled steel sheet. In addition, the steel sheet may be passed through molten zinc in the case of producing a galvanized steel sheet, and, further, an alloying treatment may be performed in the case of producing a galvannealed steel sheet.

[Galvanizing Process]

In the case where a galvanizing treatment is performed, it is preferable that the treatment be performed in a temperature range of 420° C. or higher and 550° C. or lower, and the treatment may be performed in the cooling process after the annealing process. It is preferable that a galvanizing bath containing 0.15 mass % to 0.23 mass % of Al be used for a GI (galvanized steel sheet) and that a galvanizing bath containing 0.12 mass % to 0.20 mass % of Al be used for a GA (galvannealed steel sheet). In addition, it is preferable that a coating weight be 20 g/m$^2$ to 70 g/m$^2$ per side (both side coating). It is preferable that Fe concentration in a coating layer be 7 mass % to 15 mass % as a result of an alloying treatment performed for a GA as described below.

[Alloying Treatment Process]

In the case where an alloying treatment temperature in an alloying treatment is lower than 470° C., there is a problem in that alloying does not progress. On the other hand, in the case where the alloying treatment temperature is higher than 600° C., since there is an increase in the grain size of ferrite, it is difficult to achieve the desired strength. Therefore, the alloying treatment temperature is set to be 470° C. or higher and 600° C. or lower. That is, the alloying treatment on a galvanizing layer is performed in a temperature range of 470° C. or higher and 600° C. or lower.

In the case of the manufacturing method, in which a reheating process is performed after a holding process following a heating process, a holding process (first annealing) is performed after the heating process, and reheating (second annealing) is performed by performing a reheating process using a continuous annealing line (CAL) or a galvanizing line (CGL) without performing a cooling process. In the case where the second heating is performed by using a galvanizing line (CGL), a galvanizing treatment is performed in a cooling process after reheating has been performed after the cooling process following the reheating process described above. In addition, after that, an alloying treatment is appropriately performed.

In the manufacturing method, by first heating a steel sheet to a temperature range of 450° C. or higher and 800° C. or lower and then holding the steel sheet in the first annealing process, since non-recrystallized ferrite is sufficiently recrystallized, a texture, which is advantageous for increasing Young's modulus, an average r value, and an LDR, is grown.

In addition, as described above, by increasing the degree of the integration particularly in γ-fiber in the first annealing process, since ferrite and martensite highly integrated in α-fiber and γ-fiber are formed even in the case where martensite is dispersed in a ferrite base microstructure in the second annealing process performed after the first annealing process, there is no great change in texture, which results in an effective increase in strength.

Here, skin pass rolling may be performed after producing, for example, a cold-rolled steel sheet, a galvanized steel sheet, or a galvannealed steel sheet by performing heat treatments as described above. In the case where skin pass rolling is performed after heat treatments have been performed as described above, it is preferable that the elongation ratio of skin pass rolling be 0.1% or more and 1.5% or less. Since there is an insufficient effect of shape correction and difficulty in control in the case where the elongation ratio is less than 0.1%, the lower limit of the appropriate range of the elongation ratio is set to be 0.1%. In addition, since there is a significant decrease in productivity in the case where the elongation ratio is more than 1.5%, the upper limit of the appropriate range of the elongation ratio is set to be 1.5%. Here, skin pass rolling may be performed in-line or off-line. In addition, the number of passes of skin pass rolling may be one or plural in order to achieve the target elongation ratio.

First, the chemical composition will be described for a second embodiment of the present disclosure. Here, in the following description, "%" used when describing a chemical composition of steel represents "mass %", unless otherwise noted.

[C: 0.060% or More and 0.150% or Less]

C is a chemical element which contributes to an increase in Young's modulus by controlling grain growth as a result of combining with Ti and V to form precipitates (carbides) when annealing is performed and which is imperative for controlling the area ratio and hardness of martensite when utilizing microstructure strengthening through the use of martensite. In the case where the C content is less than 0.060%, since there is an increase in ferrite grain size, since it is difficult to achieve the area ratio of martensite needed, and since there is no increase in the hardness of martensite, it is not possible to achieve sufficient strength. On the other hand, in the case where the C content is more than 0.150%, the effect of carbides becomes saturated, and it is necessary to increase the contents of Ti and V in accordance with an increase in C content. Also, there is an increase in alloy costs. Therefore, the C content is set to be 0.060% or more and 0.150% or less, or preferably 0.080% or more and 0.130% or less.

[Si: 0.50% or More and 2.20% or Less]

Si is one of the important chemical elements in the present disclosure. Since Si, which is a ferrite-stabilizing chemical element, increases Young's modulus, an average r value, and an LDR by promoting ferrite transformation in a cooling process when annealing is performed, and since Si is capable of promoting the formation of low temperature transformation-forming phases by stabilizing austenite as a result of concentrating C in austenite, it is possible to increase the strength of steel as needed. Moreover, since Si which forms a solid solution in ferrite increases the work hardening capability, there is an increase in the ductility of ferrite. In order to realize such effects, it is necessary that the Si content be 0.50% or more. On the other hand, in the case where the Si content is more than 2.20%, there is a decrease in weldability of a steel sheet, and the occurrence of a so-called red scale, a surface defect in a hot-rolled steel sheet, is promoted because the formation of fayalite is promoted on the surface of a slab when heating is performed before hot rolling is performed. Moreover, Si oxides which are formed on the surface decrease the phosphatability in the case where a steel sheet is used as a cold rolled steel sheet, and in addition, Si oxides which are formed on the surface induce bare spots in the case where a steel sheet is used as a galvanized steel sheet. Therefore, the Si content is set to be 0.50% or more and 2.20% or less, or preferably 0.80% or more and 2.10% or less.

[Mn: 1.00% or More and 3.00% or Less]

Mn greatly contributes to an increase in strength by increasing hardenability and by promoting the formation of low temperature transformation-forming phases in a cooling process when annealing is performed, and in addition, contributes to an increase in strength by functioning as a solid solution strengthening chemical element. In order to realize such effects, it is necessary that the Mn content be 1.00% or more. On the other hand, in the case where the Mn content is more than 3.00%, since the formation of ferrite, which is necessary for increasing Young's modulus, an average r value, and an LDR in a cooling process when annealing is performed, is markedly inhibited, and since there is an increase in the strength of steel due to an increase in the amount of low temperature transformation-forming phases formed, there is a decrease in workability. Also, such a large amount of Mn decreases the weldability of a steel sheet. Therefore, the Mn content is set to be 1.00% or more and 3.00% or less, or preferably 1.50% or more and 2.80% or less.

[P: 0.100% or Less]

P is a chemical element which is effective for solid solution strengthening, which may be added in accordance with desired strength, and which is effective for forming a multi-phase microstructure in order to promote ferrite transformation. However, in the case where the P content is more than 0.100%, there is a decrease in spot weldability. In addition, there is a decrease in zinc coatability as a result of decreasing an alloying speed in the case where an alloying treatment is performed on a galvanizing film. Therefore, it is necessary that the P content be 0.100% or less, or preferably 0.001% or more and 0.100% or less.

[S: 0.0100% or Less]

Since S causes hot cracking when hot rolling is performed, and since S decreases local deformation capability as a result of being present in the form of sulfides, it is preferable that the S content be as small as possible. Therefore, it is preferable that the S content be 0.0100% or less, or more preferably limited to 0.0050% or less. On the other hand, in the case where the S content is limited to less than 0.0001%, there is an increase in manufacturing costs. Accordingly, it is preferable that the lower limit of the S content be set to be 0.0001%. Therefore, it is preferable that the S content be 0.0100% or less, or preferably 0.0001% or more and 0.0100% or less, or more preferably 0.0001% or more and 0.0050% or less.

[Al: 0.010% or More and 2.500% or Less]

Since Al is effective for steel as a deoxidization agent, it is preferable that the Al content be 0.010% or more. Moreover, since Al, which is a ferrite-forming chemical element, promotes the formation of ferrite in a cooling process when annealing is performed, and since Al promotes the formation of low temperature transformation-forming phases by stabilizing austenite as a result of concentrating C in austenite, it is possible to increase the strength of steel as needed. In order to realize such effects, it is more preferable that the Al content be 0.020% or more. On the other hand, in the case where the Al content is more than 2.500%, since a temperature range for forming an austenite single phase is eliminated due to a significant rise in the Ar3 transformation temperature, it is not possible to finish hot rolling in a temperature range for forming austenite. Therefore, the Al content is set to be 0.010% or more and 2.500% or less, or preferably 0.020% or more and 2.500% or less.

[N: 0.0100% or Less]

N is a chemical element which decreases the ageing resistance of steel. In particular, in the case where the N content is more than 0.0100%, there is a significant decrease in ageing resistance. Therefore, the N content is set to be 0.0100% or less, or more preferably limited to 0.0060% or less. In addition, it is acceptable that the lower limit of the N content be about 0.0005% under some constraints regarding manufacturing techniques.

[Ti: 0.001% or More and 0.200% or Less]

Ti is one of the important chemical elements in the present disclosure. Ti effectively contributes to an increase in strength by forming ferrite grown in an orientation which is advantageous for increasing Young's modulus, an average r value, and an LDR and by inhibiting an increase in the size of recrystallized grains when annealing is performed as a result of forming precipitates with C, S, and N. In addition, in the case where B is added, since the precipitation of BN is inhibited as a result of Ti precipitating N in the form of TiN, the effect of B described below is effectively realized. In order to realize such effects, it is necessary that the Ti content be 0.001% or more. On the other hand, in the case where the Ti content is more than 0.200%, since carbonitrides having a large grain size are retained because carbonitrides are not completely dissolved when ordinary slab reheating is performed, the effects of increasing strength and inhibiting recrystallization are not realized. Also, in the case where hot rolling is performed without performing a process in which a continuously cast slab is first cooled and then reheated, the contribution of the additional amount of Ti over 0.200% to inhibiting recrystallization is small, and there is an increase in alloy costs. Therefore, the Ti content is set to be 0.001% or more and 0.200% or less, or preferably 0.005% or more and 0.200% or less.

[V: 0.001% or More and 0.200% or Less]

V is one of the important chemical elements in the present disclosure. V effectively contributes to an increase in strength by forming ferrite grown in an orientation which is advantageous for increasing Young's modulus, an average r value, and an LDR and by inhibiting an increase in the size of recrystallized grains when annealing is performed as a result of combining with C to form precipitates. In order to realize such effects, it is necessary that the V content be 0.001% or more. On the other hand, in the case where the V content is more than 0.200%, since carbonitrides having a large grain size are retained because carbonitrides are not completely dissolved when ordinary slab reheating is performed, the effects of increasing strength and inhibiting recrystallization are not realized. Also, in the case where hot rolling is performed without performing a process in which a continuously cast slab is first cooled and then reheated, the contribution of the additional amount of V over 0.200% to inhibiting recrystallization is small, and there is an increase in alloy costs. Therefore, the V content is set to be 0.001% or more and 0.200% or less, or preferably 0.005% or more and 0.200% or less.

In addition, it is necessary that the contents of C, N, S, Ti and V described above satisfy relational expression (2) below.

$$500 \leq C^* \leq 1300 \qquad (2),$$

where $C^*=(C-(12.0/47.9)\times(Ti-(47.9/14.0)\times N-(47.9/32.1)\times S)-(12.0/50.9)\times V)\times 10000$, where atomic symbols in the relational expression respectively represent the contents (mass %) of the corresponding chemical elements, and where $C^*$ is represented in units of mass ppm.

By controlling the amount of a solid solute C to be 500 mass ppm or more and 1300 mass ppm or less, it is possible to grow an orientation which is advantageous for increasing Young's modulus, an average r value, and an LDR when cold rolling and annealing are performed, and to achieve satisfactory strength. Therefore, $C^*$, which represents the amount of a solid solute C, is set to be 500 mass ppm or more and 1300 mass ppm or less as expressed by relational expression (1) above. Here, C in steel combines with Ti and V to form precipitates such as TiC and VC. On the other hand, Ti in steel combines with N and S, more readily than with C, to form precipitate such as TiN and TIS. Therefore, it is possible to derive the amount of a solid solute C in steel in the form of $C^*$ described above in consideration of such precipitation.

Some embodiments include the addition of at least one chemical element selected from among Cr: 0.05% or more and 1.00% or less, Mo: 0.05% or more and 1.00% or less, Ni: 0.05% or more and 1.00% or less, and Cu: 0.05% or more and 1.00% or less, B: 0.0003% or more and 0.0050% or less, and at least one chemical element selected from among Ca: 0.0010% or more and 0.0050% or less, Mg: 0.0005% or more and 0.0100% or less, and REM: 0.0003% or more and 0.0050% or less to the high strength steel sheet having a high Young's modulus according to the present disclosure separately or in combination in addition to the constituent chemical elements described above.

Cr, Mo, Ni, and Cu not only function as solid solution strengthening chemical elements but also facilitate the formation of a multi-phase microstructure by stabilizing austenite in a cooling process when annealing is performed. In order to realize such an effect, it is necessary that the content of each of Cr, Mo, Ni, and Cu be 0.05% or more. On the other hand, in the case where the content of each of Cr, Mo, Ni, and Cu is more than 1.00%, there is a decrease in formability and spot weldability. Therefore, in the case where Cr, Mo, Ni, and Cu are added, the content of each of Cr, Mo, Ni, and Cu is set to be 0.05% or more and 1.00% or less.

Since B promotes the formation of martensite by stabilizing austenite as a result of inhibiting the formation of pearlite or bainite from austenite, B is effective for achieving satisfactory strength. Such an effect is realized in the case where the B content is 0.0003% or more. On the other hand, in the case where the B content is more than 0.0050%, the effect becomes saturated, and there is a decrease in manufacturability when hot rolling is performed. Therefore, in the case where B is added, the B content is set to be 0.0003% or more and 0.0050% or less.

Ca, Mg, and REM are chemical elements which are used for deoxidization and which are effective for decreasing the negative effect of sulfides on local ductility by spheroidizing the shape of sulfides. In order to realize such effects, it is necessary that the contents of Ca, Mg, and REM be respectively 0.0010% or more, 0.0005% or more, and 0.0003% or more. However, in the case where the contents of Ca, Mg, and REM are respectively more than 0.0050%, more than 0.0100%, and more than 0.0050%, since there is an increase in the amount of inclusions and the like, surface defects and internal defects occur. Therefore, in the case where Ca, Mg, and REM are added, the contents of Ca, Mg, and REM are respectively set to be 0.0010% or more and 0.0050% or less, 0.0005% or more and 0.0100% or less, and 0.0003% or more and 0.0050% or less.

The remaining constituent chemical elements other than those whose contents are described above are Fe and inevitable impurities. Here, chemical elements other than those described above may be added as long as the effect of the present disclosure is not decreased. However, since oxygen (O) has a negative effect on the quality of a steel sheet because O forms non-metal inclusions, it is preferable that the O content be limited to 0.003% or less.

Hereafter, the microstructure will be described.

[Area Ratio of Ferrite: 20% or More]

Ferrite is effective for growing a texture which is advantageous for increasing Young's modulus, an average r value, and an LDR. In order to realize such an effect, it is necessary that the area ratio of ferrite be 20% or more. It is more preferable that the area ratio of ferrite be 30% or more in order to further increase Young's modulus, an average r value, and an LDR. Herein, the meaning of "ferrite" includes bainitic ferrite, polygonal ferrite, and acicular ferrite, which do not contain carbide precipitates, in addition to so-called ferrite.

[Area Ratio of Martensite: 5% or More]

As a result of martensite being included, there is an increase in strength and strength-elongation balance. In the case where the area ratio of martensite is less than 5%, it is difficult to achieve the tensile strength TS needed, specifically, a tensile strength TS of 780 MPa or more. Therefore, it is necessary that the area ratio of martensite be set to be 5% or more.

Here, it is possible to determine the area ratios of ferrite and martensite by polishing a cross section (L-cross section) in the thickness direction parallel to the rolling direction of a steel sheet, by etching the polished cross section by using a 3 vol. %-nital solution, by observing a portion located at ¼ of the thickness (position located at a distance equal to ¼ of the thickness in the depth direction from the surface of a steel sheet) by using a SEM (Scanning Electron Microscope) at a magnification of 2000 times in three fields of view, by calculating the area ratios of the three fields of view for each of the microstructures (ferrite and martensite) by analyzing the microstructure images obtained from the three fields of view by using Adobe Photoshop produced by Adobe Systems Inc., and by calculating the average value of the three area ratios. In addition, in the microstructure image described above, ferrite is identified as a gray microstructure (matrix microstructure), and martensite is identified as a white microstructure.

[Average Grain Size of Ferrite: 20.0 μm or Less]

In the case where the average grain size of ferrite is more than 20.0 μm, it is not possible to achieve high strength. Therefore, the average grain size of ferrite is set to be 20.0 μm or less in order to increase strength by decreasing the grain size of ferrite. In addition, although it is not necessary to put a particular limitation on the average grain size of ferrite, since there is a tendency for ductility to decrease in the case where the average grain size of ferrite is less than 1 μm, it is preferable that the average grain size of ferrite be 1 μm or more.

Here, the average grain size of ferrite was, by using Adobe Photoshop described above, calculated by dividing the value obtained by calibrating the length of a line segment drawn on an image to a practical length by the number of grains through which the line segment drawn on an image passes.

Here, in the microstructure according to the present disclosure, it is preferable that the sum of the area ratios of ferrite and martensite described above be 90% or more. There is no decrease in the effect of the present disclosure in the case where the microstructure includes, for example, tempered martensite, bainite, tempered bainite, pearlite, and carbides such as cementite in an amount of 10% or less in terms of area ratio in addition to ferrite and martensite.

[Inverse Intensity Ratios of γ-Fiber for α-Fiber in Ferrite and Martensite: 1.00 or More Each]

α-fiber is a fiber texture having the <110> axis parallel to the rolling direction, and γ-fiber is a fiber texture having the <111> axis parallel to the normal direction to the rolling direction. Metal having a body-centered cubic structure is characterized in that the α-fiber and the γ-fiber are strongly grown due to rolling deformation and in that such kinds of textures are also formed due to recrystallization.

Since it is possible to increase Young's modulus, an average r value, and an LDR in all directions by growing γ-fiber in ferrite and martensite, it is necessary that the inverse intensity ratios of γ-fiber for α-fiber in ferrite and martensite at a position located at ¼ of the thickness of a steel sheet be 1.00 or more. Here, the inverse intensity ratios of γ-fiber for α-fiber in ferrite and martensite were calculated by polishing a cross section (L-cross section) in the thickness direction parallel to the rolling direction of a steel sheet, by determining grain orientations in a portion located at ¼ of the thickness (position located at a distance equal to ¼ of the thickness in the depth direction from the surface of a steel sheet) by using SEM-EBSD (Electron Back-Scatter Diffraction), by distributing the obtained data to the microstructures (ferrite and martensite) by using OIM Data Analysis produced by AMETEK Inc., and by calculating inverse intensity ratios of γ-fiber for α-fiber.

By controlling the microstructure of steel having the chemical composition described above to be one described above, a high strength steel sheet having a high Young's modulus is obtained. In addition, the high strength steel sheet having a high Young's modulus according to the present disclosure may be a cold-rolled steel sheet, a coated steel sheet having a coating film such as a galvanizing film, a galvannealing film, an electrogalvanizing film, or an Al coating film on the surface thereof, or a hot-rolled steel sheet.

The high strength steel sheet having a high Young's modulus according to the disclosed embodiments described above has the following characteristics.

[Young's Modulus in the Rolling Direction and in a Direction at an Angle of 45° to the Rolling Direction is 205 GPa or More, and Young's Modulus in a Direction at a Right Angle to the Rolling Direction is 220 GPa or More]

In the case where a thickness is reduced by using a high strength steel sheet having a TS of 780 MPa or more, there is a decrease in the rigidity of structural parts. Therefore, in order to achieve both sufficient weight reduction and satisfactory rigidity of structural parts, in the present disclosure, Young's modulus is limited to be 205 GPa or more in the rolling direction and in a direction at an angle of 45° to the rolling direction and 220 GPa or more in a direction at a right angle to the rolling direction, preferably 208 GPa or more in the rolling direction and in a direction at an angle of 45° to the rolling direction and 223 GPa or more in a direction at a right angle to the rolling direction, or more preferably 210 GPa or more in the rolling direction and in a direction at an angle of 45° to the rolling direction and 225 GPa or more in a direction at a right angle to the rolling direction.

[Average r Value: 1.05 or More]

A high strength steel sheet having a TS of 780 MPa or more is much poorer in terms of press formability, in particular deep drawability, than a mild steel sheet. Therefore, in order to use a high strength steel sheet for members such as inner and outer panels and chassis which are formed mainly by using a drawing method, in the examples of the present disclosure, an average r value is limited to be 1.05 or more, preferably 1.07 or more, or more preferably 1.10 or more.

[Limiting Drawing Ratio (LDR): 2.03 or More]

A high strength steel sheet having a TS of 780 MPa or more is much poorer in terms of press formability, in particular deep drawability, than a mild steel sheet. Therefore, in order to use a high strength steel sheet for members such as inner and outer panels and chassis which are formed mainly by using a drawing method, in the examples of the present disclosure, a limiting drawing ratio (LDR) is limited to be 2.03 or more, preferably 2.06 or more, more preferably 2.09 or more, or even more preferably 2.12 or more.

Hereafter, the method for manufacturing such a high strength steel sheet having a high Young's modulus will be described.

First, in the case of producing a cold-rolled steel sheet, the method includes heating a steel slab having the chemical composition described above obtained by using, for example, a continuous casting method to a temperature range of 1150° C. or higher and 1300° C. or lower (steel slab heating process), then hot-rolling the heated steel slab in a finishing temperature range of 850° C. or higher and 1000° C. or lower (hot rolling process), coiling the hot-rolled steel sheet in a coiling temperature range of 500° C. or higher and 800° C. or lower (coiling process), then cold-rolling the coiled steel sheet with a cold rolling reduction of 40% or more in order to obtain a cold-rolled steel sheet (cold rolling process), heating the cold-rolled steel sheet to a temperature range of 450° C. or higher and 800° C. or lower (heating process), holding the heated steel sheet in the heating temperature range for 300 seconds or more (holding process after the heating process), subsequently heating the held steel sheet to a temperature of 750° C. or higher and 950° C. or lower (reheating process), and then cooling the heated steel sheet at an average cooling rate of 3° C./sec or more in a temperature range of 300° C. or higher and 700° C. or lower (cooling process after the reheating process). By using this manufacturing method, it is possible to obtain a high strength steel sheet having a high Young's modulus, which is a cold-rolled steel sheet, that is, a high strength cold-rolled steel sheet having a high Young's modulus.

In addition, in the case of producing a galvanized steel sheet, the method includes heating a steel slab having the chemical composition described above to a temperature range of 1150° C. or higher and 1300° C. or lower (steel slab heating process), then hot-rolling the heated steel slab in a finishing temperature range of 850° C. or higher and 1000° C. or lower (hot rolling process), coiling the hot-rolled steel sheet in a coiling temperature range of 500° C. or higher and 800° C. or lower (coiling process), then cold-rolling the coiled steel sheet with a cold rolling reduction of 40% or more in order to obtain a cold-rolled steel sheet (cold rolling process), heating the cold-rolled steel sheet to a temperature range of 450° C. or higher and 800° C. or lower (heating process), holding the heated steel sheet in the heating temperature range for 300 seconds or more (holding process after the heating process), subsequently heating the held steel sheet to a temperature of 750° C. or higher and 950° C. or lower (reheating process), then cooling the heated steel sheet at an average cooling rate of 3° C./sec or more in a temperature range of 550° C. or higher and 700° C. or lower (cooling process after the reheating process), and then performing a galvanizing treatment (galvanizing process). By using this manufacturing method, it is possible to obtain a high strength steel sheet having a high Young's modulus, which is a galvanized steel sheet, that is, a high strength galvanized steel sheet having a high Young's modulus. Moreover, in the case of producing a galvannealed steel sheet, the method further includes, after the galvanizing treatment has been performed, performing a galvannealing treatment in a temperature range of 470° C. or higher and 600° C. or lower (alloying treatment process). By using this manufacturing method, it is possible to obtain a high strength steel sheet having a high Young's modulus, which is a galvannealed steel sheet, that is, a high strength galvannealed steel sheet having a high Young's modulus.

Hereafter, each process will be described in detail.

[Steel Slab Heating Process]

Ti- and V-based precipitates which are present and untreated at the stage of heating a cast steel slab will be retained in the form of precipitates having a large grain size in a finally obtained steel sheet without contributing to an increase in strength, Young's modulus, an average r value, or an LDR. Therefore, when a steel slab is heated, it is necessary to re-dissolve Ti- and V-based precipitates which are precipitated when the steel slab is cast. The contribution of this method to an increase in strength is recognized when heating is performed at a temperature of 1150° C. or higher. In addition, it is preferable that heating be performed at a temperature of 1150° C. or higher in order to achieve a smooth steel sheet surface without a crack or irregularity by removing defects such as blowholes and segregates in the surface layer of a slab along with scale. However, in the case where the heating temperature is higher than 1300° C., there is an increase in the grain size of austenite, which results in a decrease in strength and ductility due to an increase in the grain size of the final microstructure. Therefore, a steel slab is heated to a temperature range of 1150° C. or higher and 1300° C. or lower. That is, the slab heating temperature is set to be 1150° C. or higher and 1300° C. or lower.

[Hot Rolling Process]

A hot rolling process consists of rough rolling and finish rolling, and a heated steel slab is made into a hot-rolled steel sheet by preforming such rough rolling and finish rolling. In the case where the finishing temperature of hot rolling is higher than 1000° C., since there is a significant increase in the amount of oxides (hot rolling scale) formed, the interface between base steel and oxides is roughened, which results in a decrease in surface quality after downstream processes such as a pickling process and a cold rolling process have been performed. On the other hand, in the case where the finishing temperature of hot rolling is lower than 850° C., there is an increase in rolling load due to an increase in rolling force, and an abnormal texture is grown due to an increase in rolling reduction without recrystallization of austenite. As a result, since there is significant in-plane anisotropy in the final product, there is a decrease not only in the uniformity of material properties but also in Young's modulus, an average r value, and an LDR. Therefore, the finishing temperature of hot rolling is set to be 850° C. or higher and 1000° C. or lower, or preferably 850° C. or higher and 950° C. or lower.

Here, a steel slab is made into a sheet bar by performing rough rolling under ordinary conditions. In the case where the heating temperature is low, it is preferable that a sheet bar be heated by using a bar heater and the like before finish rolling is performed from the viewpoint of preventing problems when hot rolling is performed.

[Coiling Process]

In the case where a coiling temperature is higher than 800° C. when a hot-rolled steel sheet is coiled after hot rolling has been performed, the integration of an orientation during cold rolling is obstructed due to an increase in the grain size of ferrite, and there is a decrease in the effect of inhibiting the recrystallization of ferrite and an increase in the grain size of austenite when annealing is performed due to an increase in the grain size of carbonitrides of Ti and V. On the other hand, in the case where the coiling temperature is lower than 500° C., hard bainite and martensite are formed in addition to ferrite. In this case, non-uniform deformation occurs when cold rolling is performed. As a result, since a texture is not grown after annealing has been performed, there is no increase in Young's modulus, an average r value, or an LDR. Therefore, the coiling temperature is set to be 500° C. or higher and 800° C. or lower. That is, coiling is performed in a temperature range of 500° C. or higher and 800° C. or lower after hot rolling has been performed.

[Cold Rolling Process]

By performing cold rolling after the hot rolling process, $\alpha$-fiber and $\gamma$-fiber, which are advantageous for increasing Young's modulus, an average r value, and an LDR, are integrated. That is, by growing $\alpha$-fiber and $\gamma$-fiber by performing cold rolling, since it is possible to increase the amount of ferrite having $\alpha$-fiber and $\gamma$-fiber, in particular, $\gamma$-fiber in a microstructure after an annealing process has been performed, it is possible to increase Young's modulus, an average r value, and an LDR. In order to realize such an effect, it is necessary that the cold rolling reduction be 40% or more. It is more preferable that the cold rolling reduction be 50% or more from the viewpoint of further increasing Young's modulus, an average r value, and an LDR. On the other hand, since there is difficulty in manufacturing due to an increase in rolling force in the case where the cold rolling reduction is high, it is preferable that the cold rolling reduction be 80% or less. Therefore, the cold rolling reduction is set to be 40% or more, preferably 40% or more and 80% or less, or more preferably 50% or more and 80% or less. Here, without putting any particular limitation on the number of rolling passes or the rolling reduction per pass of cold rolling, the effect of the present disclosure is realized.

[Heating Process]

In the case where an annealing temperature in a heating process is low, since a non-recrystallized microstructure is retained, the integration into $\gamma$-fiber is difficult, which results in a decrease in Young's modulus, an average r value, and an LDR in all directions. Therefore, the annealing temperature is set to be 450° C. or higher. It is preferable that the annealing temperature be 550° C. or higher from the viewpoint of further increasing Young's modulus, an average r value, and an LDR. On the other hand, in the case where the annealing temperature is higher than 800° C., there is an increase in the grain size of austenite, it is difficult for ferrite retransformed in a cooling process after annealing has been performed to be integrated into $\alpha$-fiber and $\gamma$-fiber, in particular, into $\gamma$-fiber. Therefore, the annealing temperature in the heating process is set to be 450° C. or higher and 800° C. or lower. That is, heating is performed in a temperature range of 450° C. or higher and 800° C. or lower, or preferably in a temperature range of 550° C. or higher and 800° C. or lower, in the heating process.

[Holding Process after a Heating Process]

In the case where a holding time in the above-described temperature range of 450° C. or higher and 800° C. or lower is less than 300 seconds, since a non-recrystallized microstructure is retained, the integration into γ-fiber is difficult, which results in a decrease in Young's modulus, an average r value, and an LDR in all directions. Therefore, the holding time is set to be 300 seconds or more. In addition, although it is not necessary to put a particular limitation on the upper limit of the holding time, since there is an increase in the grain size of recrystallized ferrite in the case where the holding time is more than 100000 seconds, it is preferable that the holding time be 100000 seconds or less. Therefore, the holding time is set to be 300 seconds or more, or preferably 300 seconds or more and 100000 seconds or less. In the case where a cooling process is performed after the heating process, cooling may be performed to room temperature, or a treatment passing through an over-ageing temperature range may be performed. Here, although it is not necessary to put a particular limitation on a cooling rate, since there may be a deterioration in the shape of a steel sheet in the case where an average cooling rate down to room temperature or an over-ageing temperature range is more than 80° C./sec, it is preferable that the average cooling rate be 80° C./sec or less.

[Reheating Process]

In the case where an annealing temperature in a reheating process is lower than 750° C., an insufficient amount of austenite is formed. As a result, since it is not possible to form a sufficient amount of martensite in a cooling process after annealing has been performed in the reheating process, it is difficult to achieve the desired strength. In addition, since a non-recrystallized microstructure is retained, there is a decrease in ductility. Therefore, the annealing temperature is set to be 750° C. or higher. In addition, in the case where the annealing temperature when annealing is performed is higher than 950° C., since there is an increase in the grain size of austenite, there is a tendency for the tensile strength TS of a steel sheet finally obtained to decrease. Therefore, the annealing temperature is set to be 950° C. or lower. Therefore, the annealing temperature in the reheating process is set to be 750° C. or higher and 950° C. or lower. That is, heating is performed to a temperature range of 750° C. or higher and 950° C. or lower in the reheating process.

[Cooling Process after a Reheating Process]

In the case where a cooling rate is excessively small in a cooling process after annealing has been performed in the reheating process described above, since it is not possible to achieve the desired area ratio of martensite because untransformed austenite is transformed into pearlite, it is difficult to achieve the desired strength. For example, in the case where an average cooling rate is less than 3° C./sec in a temperature range of 300° C. or higher and 700° C. or lower in the case of producing a cold-rolled steel sheet, or in the case where an average cooling rate is less than 3° C./sec in a temperature range of 550° C. or higher and 700° C. or lower in the case of producing a galvanized steel sheet, since it is not possible to achieve the desired area ratio of martensite because untransformed austenite is transformed into pearlite, it is difficult to achieve the desired strength. Therefore, in the case of producing a cold-rolled steel sheet, the average cooling rate is set to be 3° C./sec or more in a temperature range of 300° C. or higher and 700° C. or lower. In addition, in the case of producing a galvanized steel sheet, the average cooling rate is set to be 3° C./sec or more in a temperature range of 550° C. or higher and 700° C. or lower. In addition, although it is not necessary to put a particular limitation on the upper limit of the cooling rate, since there may be a deterioration in the shape of a steel sheet in the case where the average cooling rate described above is more than 80° C./sec, it is preferable that the average cooling rate described above be 80° C./sec or less. Therefore, the average cooling rate is set to be 3° C./sec or more, or preferably 3° C./sec or more and 80° C./sec or less, in a temperature range of 300° C. or higher and 700° C. or lower in the case of producing a cold-rolled steel sheet, or in a temperature range of 550° C. or higher and 700° C. or lower in the case of producing a galvanized steel sheet.

After the cooling process following the reheating process has been performed, a treatment passing through an over-ageing temperature range may be performed in the case of producing a cold-rolled steel sheet. In addition, the steel sheet may be passed through molten zinc in the case of producing a galvanized steel sheet, and, further, an alloying treatment may be performed in the case of producing a galvannealed steel sheet.

[Galvanizing Process]

In the case where a galvanizing treatment is performed, it is preferable that the treatment be performed in a temperature range of 420° C. or higher and 550° C. or lower, and the treatment may be performed in the cooling process after the annealing process. It is preferable that a galvanizing bath containing 0.15 mass % to 0.23 mass % of Al be used for a GI (galvanized steel sheet) and that a galvanizing bath containing 0.12 mass % to 0.20 mass % of Al be used for a GA (galvannealed steel sheet). In addition, it is preferable that a coating weight be 20 g/m$^2$ to 70 g/m$^2$ per side (both side coating). It is preferable that Fe concentration in a coating layer be 7 mass % to 15 mass % as a result of an alloying treatment performed for a GA as described below.

[Alloying Treatment Process]

In the case where an alloying treatment temperature in an alloying treatment is lower than 470° C., there is a problem in that alloying does not progress. On the other hand, in the case where the alloying treatment temperature is higher than 600° C., since there is an increase in the grain size of ferrite, it is difficult to achieve the desired strength. Therefore, the alloying treatment temperature is set to be 470° C. or higher and 600° C. or lower. That is, the alloying treatment on a galvanizing layer is performed in a temperature range of 470° C. or higher and 600° C. or lower.

In the case of the manufacturing method, in which a reheating process is performed after a holding process following a heating process, a holding process (first annealing) is performed after the heating process, and reheating (second annealing) is performed by performing a reheating process using a continuous annealing line (CAL) or a galvanizing line (CGL) without performing a cooling process. In the case where the second heating is performed by using a galvanizing line (CGL), a galvanizing treatment is performed in a cooling process after reheating has been performed after the cooling process following the reheating process described above. In addition, after that, an alloying treatment is appropriately performed.

In the manufacturing method, by first heating a steel sheet to a temperature range of 450° C. or higher and 800° C. or lower and then holding the steel sheet in the first annealing process, since non-recrystallized ferrite is sufficiently recrystallized, a texture, which is advantageous for increasing Young's modulus, an average r value, and an LDR, is grown.

In addition, as described above, by increasing the degree of the integration particularly in γ-fiber in the first annealing process, since ferrite and martensite highly integrated in α-fiber and γ-fiber are formed even in the case where martensite is dispersed in a ferrite base microstructure in the second annealing process performed after the first annealing process, there is no great change in texture, which results in an effective increase in strength.

Here, skin pass rolling may be performed after producing, for example, a cold-rolled steel sheet, a galvanized steel sheet, or a galvannealed steel sheet by performing heat treatments as described above. In the case where skin pass rolling is performed after heat treatments have been performed as described above, it is preferable that the elongation ratio of skin pass rolling be 0.1% or more and 1.5% or less. Since there is an insufficient effect of shape correction and difficulty in control in the case where the elongation ratio is less than 0.1%, the lower limit of the appropriate range of the elongation ratio is set to be 0.1%. In addition, since there is a significant decrease in productivity in the case where the elongation ratio is more than 1.5%, the upper limit of the appropriate range of the elongation ratio is set to be 1.5%. Here, skin pass rolling may be performed in-line or off-line. In addition, the number of passes of skin pass rolling may be one or plural in order to achieve the target elongation ratio.

EXAMPLE 1

Hereafter, examples of the first embodiment will be described. However, the present disclosure is not limited to the examples below.

Molten steels having chemical composition containing the constituent chemical elements given in Table 1 and the balance being Fe and inevitable impurities were manufactured by using a revolving furnace, and then made into slabs by using a continuous casting method. The obtained slabs were subjected to hot rolling under conditions given in Table 2, and then, the obtained hot-rolled steel sheets were subjected to pickling. Subsequently, the pickled steel sheets were subjected to cold rolling under the conditions given in Table 2 and subjected to heating (first annealing) and to reheating (second annealing) under the conditions given in Table 2 in order to obtain cold-rolled steel sheets (CR: cold-rolled steel sheet (without coating layer)). Some of the obtained cold-rolled steel sheets were subjected to a galvanizing treatment (GI: galvanized steel sheet) after reheating (second annealing) had been performed. Some others of the obtained cold-rolled steel sheets were subjected to an alloying treatment (GA: galvannealed steel sheet) after reheating (second annealing) and a galvanizing treatment had been performed in this order. In Table 2, the average cooling rates in a cooling process after reheating (second annealing) had been performed are those in a temperature range of 300° C. or higher and 700° C. or lower in the case of a CR and those in a temperature range of 550° C. or higher and 700° C. or lower in the case of a GI and a GA.

Here, a galvanizing bath containing 0.18 mass % of Al was used for a GI and a galvanizing bath containing 0.15 mass % of Al was used for a GA. The bath temperature was 470° C. The coating weight was 45 g/m$^2$ per side (both side coating). The Fe concentration in the coating layer of a GA was 9 mass % to 12 mass.

The mechanical properties of the sample steel sheets obtained as described above were evaluated. Mechanical properties were evaluated by performing a tensile test, Young's modulus determination, average r value determination, and a deep drawing test as described below. The results are given in Table 3. In addition, the thicknesses of the sample steel sheets are given in Table 3.

[Tensile Test]

A tensile test was performed on a JIS No. 5 tensile test piece prescribed in JIS Z 2201 (1998) taken from the steel sheet which had been subjected to temper rolling with an elongation ratio of 0.5% so that the tensile direction was the rolling direction of the steel sheet in accordance with JIS Z 2241 (1998) in order to determine tensile strength TS and total elongation EL.

[Determination of Young's Modulus]

Young's modulus was determined by using test pieces of 10 mm×50 mm which had been taken from the steel sheet in the three directions of the rolling direction (L-direction) of the steel sheet, a direction (D-direction) at an angle of 45° to the rolling direction of the steel sheet, and a direction (C-direction) at a right angle to the rolling direction of the steel sheet and by using a resonant frequency measuring machine of a transverse oscillation type in accordance with the standard (C1259) produced by the American Society to Testing Materials.

[Calculation of Average r Value]

An average r value was calculated by using the equation below from plastic strain ratios $r_L$, $r_D$, and $r_C$ which were determined by using JIS No. 5 test pieces prescribed in JIS Z 2201 (1998) which had been respectively taken from the steel sheet in the three directions of the rolling direction (L-direction) of the steel sheet, a direction (D-direction) at an angle of 45° to the rolling direction of the steel sheet, and a direction (C-direction) at a right angle to the rolling direction of the steel sheet in accordance with JIS Z 2254.

$$\text{average } r \text{ value} = (r_L + 2r_D + r_C)/4$$

Here, in the present disclosure, a case where an average r value was 1.05 or more was judged as a case of a good average r value.

[Deep Drawing Test]

Deep drawability was evaluated in terms of a limiting drawing ratio (LDR) by performing a cupping test. Among a cupping test conditions, a cylindrical punch having a diameter of 33 mmϕ was used, and a mold having a die diameter of 36.6 mm was used for a steel sheet having a thickness of 1.2 mm. The test was performed with a blank holding force of 1.5 tons (14.71 kN). Since surface frictional conditions varied depending on, for example, coating conditions, the test was performed under a high lubrication condition by placing a polyethylene sheet between the sample and the die so that the surface frictional conditions did not influence the test results. The test was performed on test pieces having a blank diameter increased at 1-mm intervals, the ratio (D/d) of the blank diameter D, with which drawing was completed without a fracture, to the punch diameter d was defined as an LDR. Here, in the present disclosure, a case where an LDR was 2.03 or more was judged as a case of good deep drawability.

In addition, by using the methods described above, the area ratio of ferrite, the area ratio of martensite, and the inverse intensity ratio of γ-fiber for α-fiber in ferrite and martensite in a portion located at ¼ of the thickness of the steel sheet were determined. The results are given in Table 3.

As Table 3 indicates, the examples of the present disclosure had a good tensile strength TS of 780 MPa or more, a good Young's modulus of 205 GPa or more in the rolling direction and in a direction at an angle of 45° to the rolling direction, a good Young's modulus of 220 GPa or more in a direction at a right angle to the rolling direction, and excellent deep drawability indicated by an average r value of 1.05 or more and a limiting drawing ratio (LDR) of 2.03 or more, which means the desired mechanical properties were achieved. On the other hand, the comparative examples were poor in terms of one or more of strength, Young's modulus in all direction, average r value, and LDR.

The first embodiment of the present disclosure has been described above. The present disclosure includes, but not limited to, the disclosed embodiments. That is, other embodiments, working examples, and operational techniques and the like, which are performed on the basis of the disclosed embodiments by those with an ordinary skill in the art are all within the scope of the present disclosure. For example, there is no particular limitation on an apparatus for performing a heat treatment on a steel sheet as long as the thermal history conditions are satisfied when the series of heat treatments included in the manufacturing methods described above are performed.

In addition, it is possible to apply the present disclosure to a steel sheet such as a hot-rolled steel sheet without a coating layer or an electrogalvanized steel sheet in order to manufacture a high strength steel sheet having a high Young's modulus with the similar effects.

TABLE 1

| Steel Grade | Chemical Composition (mass %) | | | | | | | | | | | | |
|---|---|---|---|---|---|---|---|---|---|---|---|---|---|
| | C | Si | Mn | P | S | Al | N | Ti | Nb | Cr | Mo | Ni | Cu |
| A | 0.134 | 1.02 | 2.58 | 0.015 | 0.0013 | 0.028 | 0.0038 | 0.038 | 0.158 | — | — | — | — |
| B | 0.112 | 1.52 | 1.91 | 0.014 | 0.0022 | 0.032 | 0.0034 | 0.072 | 0.060 | — | — | — | — |
| C | 0.079 | 2.08 | 1.68 | 0.013 | 0.0011 | 0.026 | 0.0036 | 0.121 | 0.012 | — | — | — | — |
| D | 0.120 | 0.69 | 2.82 | 0.026 | 0.0015 | 0.032 | 0.0032 | 0.179 | — | — | — | — | — |
| E | 0.091 | 1.58 | 2.29 | 0.029 | 0.0022 | 0.030 | 0.0030 | — | 0.162 | — | — | — | — |
| F | 0.082 | 2.18 | 1.02 | 0.023 | 0.0024 | 0.029 | 0.0029 | 0.108 | 0.022 | — | — | — | — |
| G | 0.146 | 0.51 | 2.87 | 0.024 | 0.0028 | 0.030 | 0.0032 | 0.049 | 0.149 | — | — | — | — |
| H | 0.106 | 1.18 | 2.03 | 0.027 | 0.0026 | 0.723 | 0.0031 | 0.087 | 0.103 | — | — | — | — |
| I | 0.084 | 1.72 | 1.83 | 0.029 | 0.0019 | 0.034 | 0.0032 | 0.108 | 0.028 | — | — | — | — |
| J | 0.051 | 1.12 | 2.70 | 0.028 | 0.0021 | 0.028 | 0.0030 | 0.001 | 0.019 | — | — | — | — |
| K | 0.092 | 0.42 | 2.17 | 0.011 | 0.0028 | 0.032 | 0.0031 | 0.057 | 0.124 | — | — | — | — |
| L | 0.083 | 1.09 | 0.79 | 0.024 | 0.0022 | 0.033 | 0.0033 | 0.117 | 0.011 | — | — | — | — |
| M | 0.138 | 1.41 | 3.28 | 0.028 | 0.0026 | 0.027 | 0.0034 | 0.012 | 0.198 | — | — | — | — |
| N | 0.072 | 1.04 | 1.08 | 0.024 | 0.0024 | 0.340 | 0.0044 | 0.079 | 0.067 | — | — | — | — |
| O | 0.129 | 1.53 | 2.11 | 0.025 | 0.0018 | 0.030 | 0.0029 | 0.003 | 0.002 | — | — | — | — |
| P | 0.133 | 0.93 | 2.98 | 0.019 | 0.0019 | 0.034 | 0.0036 | 0.040 | 0.177 | 0.21 | 0.18 | — | — |
| Q | 0.091 | 1.29 | 2.39 | 0.024 | 0.0020 | 0.036 | 0.0031 | 0.078 | 0.129 | — | — | 0.22 | 0.19 |
| R | 0.083 | 1.78 | 1.67 | 0.019 | 0.0018 | 0.030 | 0.0041 | 0.119 | 0.020 | — | — | — | — |
| S | 0.122 | 0.84 | 2.62 | 0.024 | 0.0024 | 0.027 | 0.0042 | 0.054 | 0.203 | — | — | — | — |
| T | 0.104 | 1.11 | 2.49 | 0.024 | 0.0017 | 0.029 | 0.0036 | 0.101 | 0.068 | — | — | — | — |
| U | 0.072 | 2.02 | 1.78 | 0.019 | 0.0022 | 0.032 | 0.0032 | 0.086 | — | — | — | — | — |
| V | 0.139 | 0.61 | 2.65 | 0.022 | 0.0031 | 0.043 | 0.0040 | 0.028 | 0.158 | — | — | — | — |
| W | 0.110 | 1.40 | 1.93 | 0.016 | 0.0018 | 0.036 | 0.0035 | 0.122 | — | — | — | — | — |
| X | 0.088 | 1.71 | 1.72 | 0.024 | 0.0021 | 0.039 | 0.0038 | 0.137 | 0.049 | — | — | — | — |
| Y | 0.125 | 1.64 | 2.09 | 0.021 | 0.0026 | 0.035 | 0.0031 | 0.104 | — | — | — | — | — |
| Z | 0.103 | 1.87 | 1.48 | 0.015 | 0.0023 | 0.038 | 0.0034 | 0.157 | 0.032 | — | — | — | — |

| Steel Grade | Chemical Composition (mass %) | | | | | | | C* (mass ppm) | Note |
|---|---|---|---|---|---|---|---|---|---|
| | B | Ca | Mg | REM | Ta | Sn | Sb | | |
| A | — | — | — | — | — | — | — | 1078 | Example Steel |
| B | — | — | — | — | — | — | — | 899 | Example Steel |
| C | — | — | — | — | — | — | — | 506 | Example Steel |
| D | — | — | — | — | — | — | — | 785 | Example Steel |
| E | — | — | — | — | — | — | — | 735 | Example Steel |
| F | — | — | — | — | — | — | — | 555 | Example Steel |
| G | — | — | — | — | — | — | — | 1183 | Example Steel |
| H | — | — | — | — | — | — | — | 745 | Example Steel |
| I | — | — | — | — | — | — | — | 568 | Example Steel |
| J | — | — | — | — | — | — | — | 517 | Comparative Steel |
| K | — | — | — | — | — | — | — | 654 | Comparative Steel |
| L | — | — | — | — | — | — | — | 559 | Comparative Steel |
| M | — | — | — | — | — | — | — | 1133 | Comparative Steel |
| N | — | — | — | — | — | — | — | 482 | Comparative Steel |
| O | — | — | — | — | — | — | — | 1311 | Comparative Steel |
| P | — | — | — | — | — | — | — | 1039 | Example Steel |
| Q | — | — | — | — | — | — | — | 582 | Example Steel |
| R | 0.0019 | — | — | — | — | — | — | 548 | Example Steel |
| S | — | 0.0015 | — | 0.0018 | — | — | — | 867 | Example Steel |
| T | — | — | 0.0021 | — | — | — | — | 736 | Example Steel |
| U | — | — | — | — | 0.0071 | — | — | 535 | Example Steel |
| V | — | — | — | — | 0.0064 | — | — | 1157 | Example Steel |
| W | — | — | — | — | — | 0.0061 | — | 831 | Example Steel |
| X | — | — | — | — | — | 0.0057 | — | 514 | Example Steel |
| Y | — | — | — | — | — | — | 0.0069 | 1026 | Example Steel |
| Z | — | — | — | — | — | — | 0.0052 | 633 | Example Steel |

Underlined portion: indicates a value out of the range according to the present invention
C*: C* = (C − (12.0/47.9) × (Ti − (47.9/14.0) × N − (47.9/32.1) × S) − (12.0/92.9) × Nb − (12.0/180.9) × Ta) × 10000, where atomic symbols in the relational expression respectively represent the contents (mass %) of the corresponding chemical elements.

TABLE 2

| No. | Steel Grade | Slab Heating Temperature (°C.) | Hot Rolling Finishing Temperature (°C.) | Coiling Temperature after Hot Rolling (°C.) | Rolling Reduction of Cold Rolling (%) | First annealing Annealing Temperature (°C.) | First annealing Annealing Time (s) | Second Annealing Annealing Temperature (°C.) | Second Annealing Average Cooling Rate (°C./s) | Alloying Treatment Temperature (°C.) | Class* | Note |
|---|---|---|---|---|---|---|---|---|---|---|---|---|
| 1 | A | 1250 | 900 | 600 | 70 | 600 | 10000 | 845 | 15 | — | CR | Example |
| 2 | A | 1250 | 900 | 600 | 80 | 700 | 10000 | 810 | 15 | — | GI | Example |
| 3 | A | 1250 | 900 | 600 | 50 | 700 | 10000 | 810 | 15 | 550 | GA | Example |
| 4 | A | 1100 | 900 | 600 | 70 | 550 | 10000 | 810 | 15 | — | GI | Comparative Example |
| 5 | A | 1250 | 800 | 600 | 70 | 550 | 10000 | 810 | 15 | 570 | GA | Comparative Example |
| 6 | A | 1250 | 900 | 450 | 70 | 550 | 10000 | 810 | 15 | — | CR | Comparative Example |
| 7 | A | 1250 | 900 | 600 | 30 | 700 | 10000 | 810 | 15 | 560 | GA | Comparative Example |
| 8 | A | 1250 | 900 | 600 | 70 | 400 | 10000 | 810 | 15 | — | CR | Comparative Example |
| 9 | A | 1250 | 900 | 600 | 70 | 700 | 200 | 810 | 15 | — | GI | Comparative Example |
| 10 | A | 1250 | 900 | 600 | 70 | 600 | 10000 | 700 | 15 | — | CR | Comparative Example |
| 11 | A | 1250 | 900 | 600 | 70 | 600 | 10000 | 810 | 1 | — | GI | Comparative Example |
| 12 | A | 1250 | 900 | 600 | 70 | 600 | 10000 | 810 | 15 | 700 | GA | Comparative Example |
| 13 | B | 1200 | 900 | 600 | 90 | 450 | 1000 | 810 | 20 | — | GI | Example |
| 14 | C | 1150 | 900 | 600 | 65 | 750 | 1000 | 950 | 15 | 560 | GA | Example |
| 15 | D | 1300 | 900 | 800 | 40 | 800 | 20000 | 790 | 15 | — | CR | Example |
| 16 | D | 1300 | 900 | 800 | 40 | 800 | 20000 | 790 | 15 | — | GI | Example |
| 17 | D | 1300 | 900 | 800 | 40 | 800 | 20000 | 790 | 15 | 530 | GA | Example |
| 18 | E | 1250 | 850 | 600 | 65 | 650 | 15000 | 850 | 15 | — | CR | Example |
| 19 | F | 1250 | 850 | 600 | 65 | 650 | 15000 | 750 | 15 | — | CR | Example |
| 20 | G | 1250 | 1000 | 600 | 60 | 650 | 15000 | 830 | 15 | — | GI | Example |
| 21 | H | 1250 | 950 | 600 | 75 | 550 | 15000 | 810 | 10 | 550 | CR | Example |
| 22 | I | 1250 | 950 | 600 | 75 | 550 | 15000 | 810 | 15 | 550 | GA | Example |
| 23 | J | 1250 | 900 | 600 | 70 | 650 | 20000 | 810 | 15 | 560 | GA | Comparative Example |
| 24 | K | 1250 | 900 | 600 | 70 | 650 | 20000 | 810 | 15 | — | CR | Comparative Example |
| 25 | L | 1250 | 900 | 600 | 70 | 650 | 20000 | 810 | 15 | 560 | GA | Comparative Example |
| 26 | M | 1250 | 900 | 600 | 70 | 650 | 20000 | 810 | 15 | — | GI | Comparative Example |
| 27 | N | 1250 | 900 | 600 | 70 | 650 | 20000 | 810 | 15 | 550 | CR | Comparative Example |
| 28 | O | 1250 | 900 | 600 | 70 | 650 | 20000 | 810 | 15 | 550 | GA | Comparative Example |
| 29 | P | 1250 | 900 | 600 | 70 | 650 | 15000 | 810 | 15 | — | GI | Example |
| 30 | Q | 1250 | 900 | 600 | 70 | 650 | 15000 | 310 | 15 | 570 | GA | Example |
| 31 | R | 1250 | 900 | 500 | 65 | 600 | 15000 | 790 | 15 | — | CR | Example |
| 32 | S | 1250 | 900 | 500 | 65 | 600 | 15000 | 790 | 15 | — | GI | Example |
| 33 | T | 1250 | 900 | 500 | 65 | 600 | 20000 | 790 | 15 | — | CR | Example |
| 34 | U | 1250 | 900 | 700 | 65 | 600 | 20000 | 810 | 3 | — | GI | Example |
| 35 | V | 1250 | 900 | 700 | 65 | 600 | 20000 | 810 | 15 | 560 | GA | Example |
| 36 | W | 1250 | 900 | 700 | 65 | 600 | 20000 | 810 | 15 | — | GI | Example |
| 37 | X | 1250 | 900 | 750 | 75 | 700 | 20000 | 845 | 15 | 550 | GA | Example |
| 38 | Y | 1250 | 900 | 750 | 75 | 700 | 300 | 845 | 15 | — | CR | Example |
| 39 | Z | 1250 | 900 | 750 | 75 | 700 | 300 | 845 | 15 | 550 | GA | Example |

Underlined portion: indicates a value out of the range according to the present invention
*Class: CR represents a cold-rolled steel sheet (without a coating layer), GI represents a galvanized steel sheet (without an alloying treatment on a galvanizing layer), and GA represents a galvannealed steel sheet

TABLE 3

| No. | Steel Grade | Thickness (mm) | Area Ratio of F (%) | Area Ratio of M (%) | Average Grain Size of F (μm) | Inverse Intensity Ratio of γ-fiber for α-fiber F | Inverse Intensity Ratio of γ-fiber for α-fiber M | Remaining Microstructure | TS (MPa) | EL (%) | Young's Modulus (GPa) L-direction | Young's Modulus (GPa) D-direction | Young's Modulus (GPa) C-direction | Average r Value | LDR | Note |
|---|---|---|---|---|---|---|---|---|---|---|---|---|---|---|---|---|
| 1 | A | 1.1 | 78 | 20 | 4.8 | 1.31 | 1.12 | θ | 782 | 26.0 | 215 | 212 | 232 | 1.25 | 2.18 | Example |
| 2 | A | 0.7 | 73 | 25 | 4.8 | 1.29 | 1.09 | θ | 785 | 24.8 | 214 | 211 | 238 | 1.28 | 2.21 | Example |

TABLE 3-continued

| | | | Area Ratio of F | Area Ratio of M | Average Grain Size of F | Inverse Intensity Ratio of γ-fiber for α-fiber | | Remaining Micro- | | | Young's Modulus (GPa) | | | | | |
|---|---|---|---|---|---|---|---|---|---|---|---|---|---|---|---|---|
| No. | Steel Grade | Thickness (mm) | (%) | (%) | (μm) | F | M | structure | TS (MPa) | EL (%) | L-direction | D-direction | C-direction | Average r Value | LDR | Note |
| 3 | A | 1.8 | 73 | 17 | 4.7 | 1.33 | 1.12 | B + θ | 781 | 25.9 | 213 | 209 | 226 | 1.15 | 2.06 | Example |
| 4 | A | 1.1 | 68 | 26 | 6.7 | 0.98 | 0.87 | θ | 834 | 21.7 | 210 | 195 | 224 | 0.89 | 1.94 | Comparative Example |
| 5 | A | 11 | 79 | 12 | 10.1 | 0.99 | 0.92 | θ | 792 | 12.6 | 210 | 200 | 218 | 0.90 | 1.94 | Comparative Example |
| 6 | A | 1.1 | 78 | 20 | 4.6 | 0.86 | 0.97 | θ | 806 | 24.1 | 211 | 194 | 226 | 0.89 | 1.94 | Comparative Example |
| 7 | A | 2.5 | 69 | 21 | 10.2 | 0.99 | 0.96 | B + θ | 759 | 25.8 | 205 | 202 | 210 | 0.88 | 1.91 | Comparative Example |
| 8 | A | 1.1 | 79 | 19 | 5.4 | 0.94 | 0.83 | θ | 878 | 20.6 | 221 | 198 | 240 | 1.15 | 2.06 | Comparative Example |
| 9 | A | 1.1 | 78 | 18 | 4.8 | 0.86 | 0.97 | θ | 819 | 22.1 | 218 | 202 | 236 | 1.18 | 2.09 | Comparative Example |
| 10 | A | 1.1 | 86 | 2 | 6.7 | 1.30 | 1.11 | θ | 742 | 26.8 | 213 | 210 | 234 | 1.23 | 2.15 | Comparative Example |
| 11 | A | 1.1 | 76 | 3 | 5.2 | 1.31 | 1.12 | θ | 753 | 27.3 | 215 | 212 | 232 | 1.25 | 2.18 | Comparative Example |
| 12 | A | 1.1 | 69 | 21 | 23.2 | 1.29 | 1.10 | B + P + θ | 772 | 26.4 | 215 | 212 | 232 | 1.25 | 2.18 | Comparative Example |
| 13 | B | 0.4 | 68 | 30 | 2.0 | 1.29 | 1.06 | θ | 989 | 18.8 | 211 | 209 | 232 | 1.18 | 2.09 | Example |
| 14 | C | 1.2 | 25 | 65 | 10.1 | 1.38 | 1.16 | B + θ | 1006 | 17.1 | 210 | 209 | 222 | 1.13 | 2.03 | Example |
| 15 | D | 2.1 | 82 | 15 | 18.1 | 1.31 | 1.12 | θ | 792 | 24.8 | 212 | 207 | 229 | 1.15 | 2.06 | Example |
| 16 | D | 2.1 | 83 | 13 | 17.8 | 1.32 | 1.13 | θ | 789 | 25.3 | 211 | 208 | 227 | 1.15 | 2.06 | Example |
| 17 | D | 2.1 | 78 | 15 | 18.0 | 1.31 | 1.12 | B + θ | 782 | 25.1 | 210 | 206 | 228 | 1.13 | 2.03 | Example |
| 18 | E | 1.2 | 77 | 21 | 10.1 | 1.36 | 1.17 | θ | 978 | 19.2 | 210 | 208 | 223 | 1.08 | 2.03 | Example |
| 19 | F | 1.2 | 79 | 19 | 4.8 | 1.34 | 1.15 | θ | 1049 | 17.5 | 211 | 209 | 224 | 1.13 | 2.03 | Example |
| 20 | G | 1.4 | 75 | 17 | 5.1 | 1.35 | 1.17 | θ | 781 | 24.8 | 213 | 211 | 223 | 1.18 | 2.09 | Example |
| 21 | H | 0.9 | 69 | 21 | 8.3 | 1.32 | 1.13 | θ | 880 | 21.2 | 211 | 210 | 228 | 1.18 | 2.09 | Example |
| 22 | I | 0.9 | 68 | 22 | 5.1 | 1.33 | 1.13 | B + θ | 1033 | 17.5 | 209 | 208 | 227 | 1.13 | 2.03 | Example |
| 23 | J | 1.1 | 87 | 3 | 25.0 | 1.30 | 1.12 | B + θ | 742 | 25.8 | 215 | 212 | 232 | 1.25 | 2.18 | Comparative Example |
| 24 | K | 1.1 | 77 | 20 | 10.4 | 0.98 | 0.89 | θ | 822 | 26.1 | 211 | 197 | 222 | 0.90 | 1.94 | Comparative Example |
| 25 | L | 1.1 | 78 | 4 | 10.9 | 1.33 | 1.14 | P + θ | 775 | 25.7 | 210 | 210 | 225 | 1.15 | 2.06 | Comparative Example |
| 26 | M | 1.1 | 15 | 83 | 5.3 | 0.94 | 0.99 | θ | 1106 | 17.2 | 210 | 204 | 218 | 0.95 | 1.97 | Comparative Example |
| 27 | N | 1.1 | 80 | 3 | 19.3 | 133 | 1.14 | θ | 761 | 27.4 | 213 | 210 | 225 | 1.18 | 2.09 | Comparative Example |
| 28 | O | 1.1 | 68 | 20 | 6.1 | 0.87 | 0.98 | B + θ | 998 | 18.8 | 209 | 200 | 229 | 1.02 | 2.00 | Comparative Example |
| 29 | P | 1.1 | 73 | 25 | 6.9 | 1.30 | 1.11 | θ | 822 | 22.0 | 212 | 209 | 234 | 1.22 | 2.12 | Example |
| 30 | Q | 1.1 | 66 | 24 | 7.4 | 1.32 | 1.13 | B + θ | 1040 | 17.6 | 209 | 208 | 226 | 1.13 | 2.03 | Example |
| 31 | R | 1.2 | 70 | 28 | 6.7 | 1.35 | 1.16 | θ | 1004 | 18.3 | 210 | 207 | 221 | 1.05 | 2.03 | Example |
| 32 | S | 1.2 | 78 | 20 | 10.3 | 1.33 | 1.14 | θ | 793 | 24.8 | 215 | 212 | 227 | 1.23 | 2.15 | Example |
| 33 | T | 1.2 | 77 | 18 | 4.9 | 1.35 | 1.16 | θ | 789 | 25.1 | 210 | 207 | 224 | 1.08 | 2.03 | Example |
| 34 | U | 1.2 | 64 | 26 | 6.8 | 1.35 | 1.16 | θ | 852 | 21.2 | 209 | 208 | 221 | 1.08 | 2.03 | Example |
| 35 | V | 1.2 | 71 | 20 | 10.6 | 1.33 | 1.14 | B + θ | 782 | 24.8 | 215 | 212 | 227 | 1.23 | 2.15 | Example |
| 36 | W | 1.2 | 76 | 15 | 5.1 | 1.35 | 1.16 | θ | 991 | 19.4 | 215 | 209 | 222 | 1.15 | 2.06 | Example |
| 37 | X | 0.9 | 63 | 27 | 7.4 | 1.31 | 1.12 | B + θ | 1052 | 17.4 | 209 | 208 | 229 | 1.15 | 2.06 | Example |
| 38 | Y | 0.9 | 69 | 24 | 10.6 | 1.32 | 1.13 | θ | 994 | 18.7 | 210 | 209 | 228 | 1.15 | 2.06 | Example |
| 39 | Z | 0.9 | 68 | 22 | 5.1 | 1.31 | 1.11 | B + θ | 989 | 19.1 | 212 | 207 | 230 | 1.15 | 2.06 | Example |

Underlined portion: indicates a value out of the range according to the present invention
F: ferrite,
M: martensite (including tempered martensite),
B: bainite (including tempered bainite),
P: pearlite,
θ: carbides such as cementite

EXAMPLE 2

Hereafter, examples of the second embodiment will be described. Here, the present disclosure is not limited to the examples below.

Molten steels having chemical composition containing the constituent chemical elements given in Table 4 and the balance being Fe and inevitable impurities were manufactured by using a revolving furnace, and then made into slabs by using a continuous casting method. The obtained slabs were subjected to hot rolling under conditions given in Table 5, and then, the obtained hot-rolled steel sheets were subjected to pickling. Subsequently, the pickled steel sheets were subjected to cold rolling under the conditions given in Table 5 and subjected to heating (first annealing) and to reheating (second annealing) under the conditions given in Table 5 in order to obtain cold-rolled steel sheets (CR: cold-rolled steel sheet (without coating layer)). Some of the obtained cold-rolled steel sheets were subjected to a galvanizing treatment (GI: galvanized steel sheet) after reheating (second annealing) had been performed. Some others of the obtained cold-rolled steel sheets were subjected to an alloying treatment (GA: galvannealed steel sheet) after reheating (second annealing) and a galvanizing treatment had been performed in this order. In Table 5, the average cooling rates in a cooling process after reheating (second annealing) had been performed are those in a temperature range of 300° C. or higher and 700° C. or lower in the case of a CR and those in a temperature range of 550° C. or higher and 700° C. or lower in the case of a GI and a GA.

Here, a galvanizing bath containing 0.18 mass % of Al was used for a GI and a galvanizing bath containing 0.15 mass % of Al was used for a GA. The bath temperature was 470° C. The coating weight was 45 g/m² per side (both side coating). The Fe concentration in the coating layer of a GA was 9 mass % to 12 mass %.

The mechanical properties of the sample steel sheets obtained as described above were evaluated. Mechanical properties were evaluated by performing a tensile test, Young's modulus determination, average r value determination, and a deep drawing test as described below. The results are given in Table 6. In addition, the thicknesses of the sample steel sheets are given in Table 6.

[Tensile Test]

A tensile test was performed on a JIS No. 5 tensile test piece prescribed in JIS Z 2201 (1998) taken from the steel sheet which had been subjected to temper rolling with an elongation ratio of 0.5% so that the tensile direction was the rolling direction of the steel sheet in accordance with JIS Z 2241 (1998) in order to determine tensile strength TS and total elongation EL.

[Determination of Young's Modulus]

Young's modulus was determined by using test pieces of 10 mm×50 mm which had been taken from the steel sheet in the three directions of the rolling direction (L-direction) of the steel sheet, a direction (D-direction) at an angle of 45° to the rolling direction of the steel sheet, and a direction (C-direction) at a right angle to the rolling direction of the steel sheet and by using a resonant frequency measuring machine of a transverse oscillation type in accordance with the standard (C1259) produced by the American Society to Testing Materials.

[Calculation of Average r Value]

An average r value was calculated by using the equation below from plastic strain ratios $r_L$, $r_D$, and $r_C$ which were determined by using JIS No. 5 test pieces prescribed in JIS Z 2201 (1998) which had been respectively taken from the steel sheet in the three directions of the rolling direction (L-direction) of the steel sheet, a direction (D-direction) at an angle of 45° to the rolling direction of the steel sheet, and a direction (C-direction) at a right angle to the rolling direction of the steel sheet in accordance with JIS Z 2254.

average $r$ value=$(r_L+2r_D+r_C)/4$

Here, in the present disclosure, a case where an average r value was 1.05 or more was judged as a case of a good average r value.

[Deep Drawing Test]

Deep drawability was evaluated in terms of a limiting drawing ratio (LDR) by performing a cupping test. Among a cupping test conditions, a cylindrical punch having a diameter of 33 mmϕ was used, and a mold having a die diameter of 36.6 mm was used for a steel sheet having a thickness of 1.2 mm. The test was performed with a blank holding force of 1.5 tons (14.71 kN). Since surface frictional conditions varied depending on, for example, coating conditions, the test was performed under a high lubrication condition by placing a polyethylene sheet between the sample and the die so that the surface frictional conditions did not influence the test results. The test was performed on test pieces having a blank diameter increased at 1-mm intervals, the ratio (D/d) of the blank diameter D, with which drawing was completed without a fracture, to the punch diameter d was defined as an LDR. Here, in the present disclosure, a case where an LDR was 2.03 or more was judged as a case of good deep drawability.

In addition, by using the methods described above, the area ratio of ferrite, the area ratio of martensite, and the inverse intensity ratio of γ-fiber for α-fiber in ferrite and martensite in a portion located at ¼ of the thickness of the steel sheet were determined. The results are given in Table 6.

As Table 6 indicates, the examples of the present disclosure had a good tensile strength TS of 780 MPa or more, a good Young's modulus of 205 GPa or more in the rolling direction and in a direction at an angle of 45° to the rolling direction, a good Young's modulus of 220 GPa or more in a direction at a right angle to the rolling direction, and excellent deep drawability indicated by an average r value of 1.05 or more and a limiting drawing ratio (LDR) of 2.03 or more, which means the desired mechanical properties were achieved. On the other hand, the comparative examples were poor in terms of one or more of strength, Young's modulus in all direction, average r value, and LDR.

The second embodiment of the present disclosure has been described above. The present disclosure includes, but not limited to, the disclosed embodiments. That is, other embodiments, working examples, and operational techniques and the like, which are performed on the basis of the disclosed embodiments by those with an ordinary skill in the art are all within the scope of the present disclosure. For example, there is no particular limitation on an apparatus for performing a heat treatment on a steel sheet as long as the thermal history conditions are satisfied when the series of heat treatments included in the manufacturing methods described above are performed.

In addition, it is possible to apply the present disclosure to a steel sheet such as a hot-rolled steel sheet without a coating layer or an electrogalvanized steel sheet in order to manufacture a high strength steel sheet having a high Young's modulus with the similar effects.

TABLE 4

| Steel Grade | Chemical Composition (mass %) | | | | | | | | | | |
|---|---|---|---|---|---|---|---|---|---|---|---|
| | C | Si | Mn | P | S | Al | N | Ti | V | Cr | Mo |
| A-2 | 0.131 | 0.98 | 2.56 | 0.015 | 0.0013 | 0.028 | 0.0038 | 0.162 | 0.042 | — | — |
| B-2 | 0.109 | 1.52 | 1.93 | 0.014 | 0.0022 | 0.032 | 0.0034 | 0.058 | 0.069 | — | — |
| C-2 | 0.079 | 2.03 | 1.69 | 0.013 | 0.0011 | 0.026 | 0.0036 | 0.009 | 0.124 | — | — |
| D-2 | 0.082 | 2.16 | 1.02 | 0.023 | 0.0024 | 0.029 | 0.0030 | 0.021 | 0.102 | — | — |

TABLE 4-continued

| Steel Grade | C | Si | Mn | P | S | Al | N | Ti | Nb | | |
|---|---|---|---|---|---|---|---|---|---|---|---|
| E-2 | 0.143 | 0.55 | 2.97 | 0.024 | 0.0022 | 0.030 | 0.0027 | 0.146 | 0.038 | — | — |
| F-2 | 0.097 | 1.19 | 1.88 | 0.027 | 0.0026 | 0.724 | 0.0031 | 0.098 | 0.093 | — | — |
| G-2 | 0.084 | 1.73 | 1.79 | 0.029 | 0.0019 | 0.034 | 0.0032 | 0.041 | 0.098 | — | — |
| H-2 | 0.056 | 1.14 | 2.58 | 0.028 | 0.0021 | 0.028 | 0.0030 | 0.016 | 0.003 | — | — |
| I-2 | 0.102 | 0.42 | 2.04 | 0.011 | 0.0028 | 0.032 | 0.0031 | 0.119 | 0.056 | — | — |
| J-2 | 0.087 | 1.13 | 0.86 | 0.024 | 0.0022 | 0.033 | 0.0033 | 0.015 | 0.115 | — | — |
| K-2 | 0.145 | 1.51 | 3.19 | 0.028 | 0.0026 | 0.027 | 0.0034 | 0.189 | 0.017 | — | — |
| L-2 | 0.071 | 0.99 | 1.14 | 0.024 | 0.0024 | 0.340 | 0.0042 | 0.066 | 0.074 | — | — |
| M-2 | 0.131 | 1.38 | 1.96 | 0.025 | 0.0018 | 0.030 | 0.0029 | 0.003 | 0.004 | — | — |
| N-2 | 0.129 | 0.87 | 2.94 | 0.019 | 0.0019 | 0.034 | 0.0036 | 0.177 | 0.041 | 0.19 | 0.22 |
| O-2 | 0.114 | 1.26 | 2.39 | 0.024 | 0.0020 | 0.036 | 0.0031 | 0.023 | 0.191 | — | — |
| P-2 | 0.077 | 1.80 | 1.52 | 0.019 | 0.0018 | 0.030 | 0.0041 | 0.018 | 0.108 | — | — |
| Q-2 | 0.112 | 0.82 | 2.68 | 0.024 | 0.0024 | 0.027 | 0.0042 | 0.192 | 0.061 | — | — |
| R-2 | 0.106 | 1.17 | 2.45 | 0.024 | 0.0017 | 0.029 | 0.0036 | 0.074 | 0.097 | — | — |

| Steel Grade | Chemical Composition (mass %) | | | | | | C* (mass ppm) | Note |
|---|---|---|---|---|---|---|---|---|
| | Ni | Cu | B | Ca | Mg | REM | | |
| A-2 | — | — | — | — | — | — | 843 | Example Steel |
| B-2 | — | — | — | — | — | — | 819 | Example Steel |
| C-2 | — | — | — | — | — | — | 510 | Example Steel |
| D-2 | — | — | — | — | — | — | 562 | Example Steel |
| E-2 | — | — | — | — | — | — | 1006 | Example Steel |
| F-2 | — | — | — | — | — | — | 542 | Example Steel |
| G-2 | — | — | — | — | — | — | 541 | Example Steel |
| H-2 | — | — | — | — | — | — | 546 | Comparative Steel |
| I-2 | — | — | — | — | — | — | 627 | Comparative Steel |
| J-2 | — | — | — | — | — | — | 598 | Comparative Steel |
| K-2 | — | — | — | — | — | — | 975 | Comparative Steel |
| L-2 | — | — | — | — | — | — | 415 | Comparative Steel |
| M-2 | — | — | — | — | — | — | 1325 | Comparative Steel |
| N-2 | — | — | — | — | — | — | 788 | Example Steel |
| O-2 | 0.18 | 0.20 | — | — | — | — | 666 | Example Steel |
| P-2 | — | — | 0.0021 | — | — | — | 512 | Example Steel |
| Q-2 | — | — | — | 0.0017 | — | 0.0022 | 540 | Example Steel |
| R-2 | — | — | — | — | 0.0019 | — | 683 | Example Steel |

Underlined portion: indicates a value out of the range according to the present invention C*: C* = (C − (12.0/47.9) × (Ti − (47.9/14.0) × N − (47.9/32.1) × S) − (12.0/50.9) × V) × 10000, where atomic symbols in the relational expression respectively represent the contents (mass %) of the corresponding chemical elements.

TABLE 5

| No. | Steel Grade | Slab Heating Temperature (°C.) | Hot Rolling Finishing Temperature (°C.) | Coiling Temperature after Hot Rolling (°C.) | Rolling Reduction of Cold Rolling (%) | First annealing Annealing Temperature (°C.) | First annealing Annealing Time (s) | Second Annealing Annealing Temperature (°C.) | Second Annealing Average Cooling Rate (°C./s) | Alloying Treatment Temperature (°C.) | Class* | Note |
|---|---|---|---|---|---|---|---|---|---|---|---|---|
| 40 | A-2 | 1250 | 900 | 600 | 70 | 600 | 10000 | 845 | 15 | — | CR | Example |
| 41 | A-2 | 1250 | 900 | 600 | 80 | 700 | 10000 | 845 | 15 | — | GI | Example |
| 42 | A-2 | 1250 | 900 | 600 | 50 | 700 | 10000 | 845 | 15 | 550 | GA | Example |
| 43 | A-2 | 1100 | 900 | 600 | 70 | 550 | 10000 | 810 | 15 | — | GI | Comparative Example |
| 44 | A-2 | 1250 | 800 | 600 | 70 | 550 | 10000 | 810 | 15 | 570 | GA | Comparative Example |
| 45 | A-2 | 1250 | 900 | 450 | 70 | 550 | 10000 | 810 | 15 | — | CR | Comparative Example |
| 46 | A-2 | 1250 | 900 | 600 | 30 | 700 | 10000 | 810 | 15 | 560 | GA | Comparative Example |
| 47 | A-2 | 1250 | 900 | 600 | 70 | 400 | 10000 | 810 | 15 | — | CR | Comparative Example |
| 48 | A-2 | 1250 | 900 | 600 | 70 | 700 | 200 | 810 | 15 | — | GI | Comparative Example |
| 49 | A-2 | 1250 | 900 | 600 | 70 | 600 | 10000 | 700 | 15 | — | CR | Comparative Example |
| 50 | A-2 | 1250 | 900 | 600 | 70 | 600 | 10000 | 810 | 1 | — | GI | Comparative Example |
| 51 | A-2 | 1250 | 900 | 600 | 70 | 600 | 10000 | 810 | 15 | 700 | GA | Comparative Example |
| 52 | B-2 | 1200 | 900 | 600 | 90 | 450 | 1000 | 810 | 20 | — | GI | Example |
| 53 | C-2 | 1150 | 900 | 600 | 65 | 750 | 1000 | 950 | 15 | 570 | GA | Example |
| 54 | D-2 | 1300 | 900 | 800 | 40 | 800 | 20000 | 790 | 15 | — | CR | Example |
| 55 | D-2 | 1300 | 900 | 800 | 40 | 800 | 20000 | 790 | 15 | — | GI | Example |

TABLE 5-continued

| No. | Steel Grade | Slab Heating Temperature (°C.) | Hot Rolling Finishing Temperature (°C.) | Coiling Temperature after Hot Rolling (°C.) | Rolling Reduction of Cold Rolling (%) | First annealing Annealing Temperature (°C.) | First annealing Annealing Time (s) | Second Annealing Annealing Temperature (°C.) | Second Annealing Average Cooling Rate (°C./s) | Alloying Treatment Temperature (°C.) | Class* | Note |
|---|---|---|---|---|---|---|---|---|---|---|---|---|
| 56 | D-2 | 1300 | 900 | 800 | 40 | 800 | 20000 | 790 | 15 | 530 | GA | Example |
| 57 | E-2 | 1250 | 850 | 600 | 65 | 650 | 15000 | 850 | 15 | — | CR | Example |
| 58 | F-2 | 1250 | 850 | 600 | 65 | 650 | 15000 | 750 | 15 | — | CR | Example |
| 59 | G-2 | 1250 | 1000 | 600 | 60 | 650 | 15000 | 830 | 15 | — | GI | Example |
| 60 | H-2 | 1250 | 950 | 600 | 75 | 550 | 15000 | 810 | 10 | 540 | GA | Comparative Example |
| 61 | I-2 | 1250 | 950 | 600 | 75 | 550 | 15000 | 810 | 10 | — | CR | Comparative Example |
| 62 | J-2 | 1250 | 950 | 600 | 70 | 550 | 15000 | 810 | 15 | 560 | GA | Comparative Example |
| 63 | K-2 | 1250 | 900 | 600 | 70 | 650 | 15000 | 810 | 15 | — | GI | Comparative Example |
| 64 | L-2 | 1250 | 900 | 600 | 70 | 650 | 20000 | 810 | 15 | — | CR | Comparative Example |
| 65 | M-2 | 1250 | 900 | 600 | 70 | 650 | 20000 | 810 | 15 | 550 | GA | Comparative Example |
| 66 | N-2 | 1250 | 900 | 600 | 70 | 650 | 20000 | 810 | 15 | — | GI | Example |
| 67 | O-2 | 1250 | 900 | 600 | 70 | 650 | 20000 | 790 | 5 | 570 | GA | Example |
| 68 | P-2 | 1250 | 900 | 600 | 70 | 650 | 15000 | 810 | 15 | — | CR | Example |
| 69 | Q-2 | 1250 | 900 | 500 | 65 | 600 | 300 | 810 | 15 | — | GI | Example |
| 70 | R-2 | 1250 | 900 | 500 | 65 | 600 | 300 | 810 | 15 | 550 | GA | Example |

Underlined portion: indicates a value out of the range according to the present invention
*Class: CR represents a cold-rolled steel sheet (without a coating layer), GI represents a galvanized steel sheet (without an alloying treatment on a galvanizing layer), and GA represents a galvannealed steel sheet.

TABLE 6

| No. | Steel Grade | Thickness (mm) | Area Ratio of F (%) | Area Ratio of M (%) | Average Grain Size of F (μm) | Inverse Intensity Ratio of γ-fiber for α-fiber F | Inverse Intensity Ratio of γ-fiber for α-fiber M | Remaining Microstructure | TS (MPa) | EL (%) | Young's Modulus (GPa) L-direction | Young's Modulus (GPa) D-direction | Young's Modulus (GPa) C-direction | Average r Value | LDR | Note |
|---|---|---|---|---|---|---|---|---|---|---|---|---|---|---|---|---|
| 40 | A-2 | 1.1 | 73 | 21 | 4.9 | 1.31 | 1.12 | θ | 798 | 24.7 | 215 | 212 | 232 | 1.25 | 2.18 | Example |
| 41 | A-2 | 0.7 | 71 | 24 | 5.9 | 1.29 | 1.09 | θ | 792 | 24.1 | 214 | 211 | 238 | 1.28 | 2.21 | Example |
| 42 | A-2 | 1.8 | 70 | 21 | 5.5 | 1.33 | 1.12 | B + θ | 783 | 25.7 | 213 | 209 | 226 | 1.15 | 2.06 | Example |
| 43 | A-2 | 1.1 | 67 | 25 | 1.8 | 0.98 | 0.87 | θ | 846 | 19.5 | 210 | 195 | 224 | 0.89 | 1.94 | Comparative Example |
| 44 | A-2 | 1.1 | 77 | 16 | 4.9 | 0.99 | 0.92 | θ | 798 | 11.8 | 210 | 200 | 218 | 0.90 | 1.94 | Comparative Example |
| 45 | A-2 | 1.1 | 75 | 19 | 4.4 | 0.86 | 0.97 | θ | 812 | 23.9 | 211 | 194 | 226 | 0.89 | 1.94 | Comparative Example |
| 46 | A-2 | 2.5 | 74 | 22 | 11.4 | 0.99 | 0.96 | θ | 743 | 26.4 | 205 | 202 | 210 | 0.88 | 1.91 | Comparative Example |
| 47 | A-2 | 1.1 | 81 | 15 | 6.2 | 0.94 | 0.83 | θ | 886 | 17.3 | 221 | 198 | 240 | 1.15 | 2.06 | Comparative Example |
| 48 | A-2 | 1.1 | 79 | 17 | 5.4 | 0.86 | 0.97 | θ | 822 | 18.0 | 218 | 202 | 236 | 1.18 | 2.09 | Comparative Example |
| 49 | A-2 | 1.1 | 83 | 4 | 1.9 | 1.30 | 1.11 | B + P + θ | 756 | 25.9 | 213 | 210 | 234 | 1.23 | 2.15 | Comparative Example |
| 50 | A-2 | 1.1 | 69 | 2 | 5.4 | 1.31 | 1.12 | B + θ | 749 | 26.2 | 215 | 212 | 232 | 1.25 | 2.18 | Comparative Example |
| 51 | A-2 | 1.1 | 72 | 18 | 24.8 | 1.29 | 1.10 | B + P + θ | 767 | 24.8 | 215 | 212 | 232 | 1.25 | 2.18 | Comparative Example |
| 52 | B-2 | 0.4 | 67 | 23 | 6.3 | 1.36 | 1.16 | θ | 1097 | 16.7 | 209 | 208 | 221 | 1.08 | 2.03 | Example |
| 53 | C-2 | 1.2 | 31 | 59 | 5.6 | 1.38 | 1.16 | B + θ | 1014 | 16.8 | 210 | 209 | 222 | 1.13 | 2.03 | Example |
| 54 | D-2 | 2.1 | 83 | 14 | 19.2 | 1.31 | 1.12 | θ | 795 | 23.8 | 212 | 207 | 229 | 1.15 | 2.06 | Example |
| 55 | D-2 | 2.1 | 77 | 17 | 18.4 | 1.32 | 1.13 | θ | 793 | 24.0 | 211 | 208 | 227 | 1.15 | 2.06 | Example |
| 56 | D-2 | 2.1 | 80 | 14 | 19.5 | 1.31 | 1.12 | B + θ | 787 | 24.4 | 210 | 206 | 228 | 1.13 | 2.03 | Example |
| 57 | E-2 | 1.2 | 79 | 18 | 5.5 | 1.36 | 1.17 | θ | 976 | 17.7 | 210 | 208 | 223 | 1.08 | 2.03 | Example |
| 58 | F-2 | 1.2 | 77 | 17 | 4.9 | 1.34 | 1.15 | θ | 794 | 23.9 | 211 | 209 | 224 | 1.13 | 2.03 | Example |
| 59 | G-2 | 1.4 | 72 | 21 | 5.2 | 1.35 | 1.17 | θ | 782 | 25.1 | 213 | 211 | 223 | 1.18 | 2.09 | Example |
| 60 | H-2 | 0.9 | 89 | 2 | 23.8 | 1.30 | 1.12 | B + θ | 739 | 26.8 | 215 | 212 | 232 | 1.25 | 2.18 | Comparative Example |
| 61 | I-2 | 0.9 | 74 | 19 | 6.4 | 0.98 | 0.89 | θ | 817 | 18.2 | 211 | 197 | 222 | 0.90 | 1.94 | Comparative Example |
| 62 | J-2 | 1.1 | 78 | 3 | 6.1 | 1.33 | 1.14 | P + θ | 773 | 25.9 | 210 | 210 | 225 | 1.15 | 2.06 | Comparative Example |

TABLE 6-continued

| No. | Steel Grade | Thickness (mm) | Area Ratio of F (%) | Area Ratio of M (%) | Average Grain Size of F (μm) | Inverse Intensity Ratio of γ-fiber for α-fiber F | M | Remaining Microstructure | TS (MPa) | EL (%) | Young's Modulus (GPa) L-direction | D-direction | C-direction | Average r Value | LDR | Note |
|---|---|---|---|---|---|---|---|---|---|---|---|---|---|---|---|---|
| 63 | K-2 | 1.1 | 13 | 81 | 5.2 | 0.94 | 0.99 | θ | 1114 | 15.6 | 210 | 204 | 218 | 0.95 | 1.97 | Comparative Example |
| 64 | L-2 | 1.1 | 81 | 2 | 19.4 | 1.33 | 1.14 | θ | 770 | 25.0 | 213 | 210 | 225 | 1.18 | 2.09 | Comparative Example |
| 65 | M-2 | 1.1 | 55 | 36 | 7.8 | 0.87 | 0.98 | B + θ | 986 | 17.6 | 209 | 200 | 229 | 1.02 | 2.00 | Comparative Example |
| 66 | N-2 | 1.1 | 76 | 14 | 15.6 | 1.31 | 1.11 | θ | 801 | 24.6 | 215 | 212 | 232 | 1.25 | 2.18 | Example |
| 67 | O-2 | 1.1 | 78 | 15 | 10.2 | 1.33 | 1.15 | θ | 846 | 18.1 | 210 | 210 | 225 | 1.15 | 2.06 | Example |
| 68 | P-2 | 1.1 | 62 | 31 | 4.9 | 1.33 | 1.14 | θ | 1083 | 16.1 | 210 | 210 | 225 | 1.15 | 2.06 | Example |
| 69 | Q-2 | 1.2 | 78 | 15 | 12.2 | 1.34 | 1.12 | θ | 802 | 23.8 | 215 | 210 | 229 | 1.22 | 2.12 | Example |
| 70 | R-2 | 1.2 | 82 | 13 | 9.8 | 1.32 | 1.13 | B + θ | 809 | 23.7 | 215 | 210 | 229 | 1.22 | 2.12 | Example |

Underlined portion: indicates a value out of the range according to the present invention
F: ferrite,
M: martensite (including tempered martensite),
B: bainite (including tempered bainite),
P: pearlite,
θ: carbides such as cementite

The invention claimed is:

1. A high strength steel sheet having a high Young's modulus, the steel sheet having a chemical composition comprising:
C: 0.060% or more and 0.150% or less, by mass %;
Si: 0.50% or more and 2.20% or less, by mass %;
Mn: 1.00% or more and 3.00% or less, by mass %;
P: 0.100% or less, by mass %;
S: 0.0100% or less, by mass %;
Al: 0.010% or more and 2.500% or less, by mass %;
N: 0.0100% or less, by mass %;
Ti: 0.001% or more and 0.200% or less, by mass %;
V: 0.001% or more and 0.200% or less, by mass %; and
Fe and inevitable impurities,
wherein:
the contents of C, N, S, Ti, and V satisfy relational expression (2):

$$500 \leq C^* \leq 1300 \quad (2),$$

where $C^* = (C - (12.0/47.9) \times (Ti - (47.9/14.0) \times N - (47.9/32.1) \times S) - (12.0/50.9) \times V) \times 10000$, where atomic symbols in the relational expression respectively represent the contents (mass %) of the corresponding chemical elements, and where $C^*$ is represented in units of mass ppm, and the steel sheet has a microstructure including ferrite in an amount of 20% or more in terms of area ratio and martensite in an amount of 5% or more in terms of area ratio, the average grain size of the ferrite being 20.0 μm or less, and the inverse intensity ratio of γ-fiber for α-fiber is 1.00 or more in each of the ferrite and the martensite.

2. The high strength steel sheet having a high Young's modulus according to claim 1, wherein the steel sheet has a Young's modulus of 205 GPa or more in a rolling direction and in direction at an angle of 45° to the rolling direction.

3. The high strength steel sheet having a high Young's modulus according to claim 2, wherein the steel sheet has a Young's modulus of 220 GPa or more in a direction at a right angle to the rolling direction.

4. The high strength steel sheet having a high Young's modulus according to claim 1, the steel sheet further having an average r value of 1.05 or more and a limiting drawing ratio (LDR) of 2.03 or more.

5. The high strength steel sheet having a high Young's modulus according to claim 1, wherein the chemical composition of the steel sheet further comprises at least one chemical element selected from among Cr: 0.05% or more and 1.00% or less, by mass %; Mo: 0.05% or more and 1.00% or less, by mass %; Ni: 0.05% or more and 1.00% or less, by mass %; and Cu: 0.05% or more and 1.00% or less, by mass %.

6. The high strength steel sheet having a high Young's modulus according to claim 1, wherein the chemical composition of the steel sheet further comprises B: 0.0003% or more and 0.0050% or less, by mass %.

7. The high strength steel sheet having a high Young's modulus according to claim 1, wherein the chemical composition of the steel sheet further comprises at least one chemical element selected from among Ca: 0.0010% or more and 0.0050% or less, by mass %; Mg: 0.0005% or more and 0.0100% or less, by mass %; and REM: 0.0003% or more and 0.0050% or less, by mass %.

8. The high strength steel sheet having a high Young's modulus according to claim 1, wherein the contents of C, N, S, Ti, and V satisfy relational expression (2a):

$$510 \leq C^* \leq 1300 \quad (2a),$$

where $C^* = (C - (12.0/47.9) \times (Ti - (47.9/14.0) \times N - (47.9/32.1) \times S) - (12.0/50.9) \times V) \times 10000$, where atomic symbols in the relational expression respectively represent the contents (mass %) of the corresponding chemical elements, and where $C^*$ is represented in units of mass ppm.

* * * * *

UNITED STATES PATENT AND TRADEMARK OFFICE
CERTIFICATE OF CORRECTION

PATENT NO. : 10,563,279 B2
APPLICATION NO. : 14/909253
DATED : February 18, 2020
INVENTOR(S) : Hidekazu Minami et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 783 days.

This patent is subject to a terminal disclaimer.

Signed and Sealed this
Twelfth Day of May, 2020

Andrei Iancu
*Director of the United States Patent and Trademark Office*